United States Patent
Cotter et al.

(10) Patent No.: US 6,241,920 B1
(45) Date of Patent: Jun. 5, 2001

(54) ELECTRICALLY OPTIMIZED HYBRID "LAST MILE" TELECOMMUNICATIONS CABLE SYSTEM

(75) Inventors: Mitchell A. Cotter, Raleigh, NC (US); John A. Taylor, Vista, CA (US)

(73) Assignee: Khamsin Technologies, LLC, Vista, CA (US)

( * ) Notice: Subject to any disclaimer, the term of this patent is extended or adjusted under 35 U.S.C. 154(b) by 0 days.

(21) Appl. No.: 09/434,780

(22) Filed: Nov. 5, 1999

Related U.S. Application Data

(62) Division of application No. 09/124,958, filed on Jul. 29, 1998, now Pat. No. 6,091,025.
(60) Provisional application No. 60/085,195, filed on May 12, 1998, provisional application No. 60/084,200, filed on Apr. 30, 1998, and provisional application No. 60/054,076, filed on Jul. 29, 1997.

(51) Int. Cl.⁷ .............................. B29D 11/00; B29C 47/12
(52) U.S. Cl. ...................... 264/1.24; 264/1.28; 264/1.29; 264/444; 264/464; 425/114
(58) Field of Search ..................... 264/442, 443, 264/444, 1.1, 1.28, 464, 1.29, 1.24; 425/174.2, 113, 114

(56) References Cited

U.S. PATENT DOCUMENTS

| | | |
|---|---|---|
| 1,586,887 | 6/1926 | Elman . |
| 1,672,979 | 6/1928 | Fondiller . |
| 1,841,473 | 1/1932 | Green . |
| 1,883,269 | 10/1932 | Yonkers . |
| 2,034,033 | 3/1936 | Green et al. ............................ 178/44 |
| 2,034,035 | 3/1936 | Green ..................................... 178/44 |
| 2,048,450 | 7/1936 | Horn ...................................... 173/13 |
| 2,228,797 | 1/1941 | Wassermann ............................ 178/45 |
| 2,669,603 | 2/1954 | Prache .................................... 178/45 |
| 2,787,656 | 4/1957 | Raisbeck ................................ 178/45 |
| 2,812,502 | 11/1957 | Doherty .................................. 333/96 |
| 2,825,760 | 3/1958 | Clogston ................................. 178/45 |
| 3,160,702 | 12/1964 | Lapsley .................................. 174/32 |
| 3,215,768 | 11/1965 | Murphy .................................. 174/36 |
| 3,285,442 | * 11/1966 | Tigner ................................... 264/444 |

(List continued on next page.)

FOREIGN PATENT DOCUMENTS 788603   6/1998   (CA) .

OTHER PUBLICATIONS

Kehler, T.P.; Coren, R.L.; "Susceptibility and Ripple Studies in Cylindrical Films", *J. of Appl. Phy.*, vol. 41, No. 3, pp. 1346–1347 (Mar. 1, 1970).

Kennedy, A.E.; Affel, H.A., "Skin–effect resistance measurements of conductors", *Proceedings of the Institute of Radio Engineers*, vol. 4, #6, Dec. 1916, pp. 523–580.

Dwight, H.B., "Skin effect in tubular and flat conductors", *Journal of the American Institute of Electrical Engineers*, Jun. 1918, pp. 1379–1403.

Carson, J.R., "Wave propagation over parallel wires: The proximity effect", *Philosophical Magazine*, vol. IXLI (Jun. 1921), pp. 607–63. Conductor.

(List continued on next page.)

*Primary Examiner*—Mathieu D. Varcot
(74) *Attorney, Agent, or Firm*—Fish & Richardson P.C.

(57) ABSTRACT

A cable system is provided which can accommodate electrical and optical cabling. The conductors of the system employ a layer which is impedance-matched to space, decreasing their cross-section to electromagnetic interference. The conductors of the system also employ a layer which symmetrizes electromagnetic interference signals, reducing the effect of interference and crosstalk on the signals carried by the conductors. The system also includes a node interface device for connection to a global electrical and fiber network. The node interface device connects to a user interface device through the cable.

9 Claims, 21 Drawing Sheets

U.S. PATENT DOCUMENTS

| | | | |
|---|---|---|---|
| 3,479,619 | 11/1969 | Ngo | 333/31 |
| 3,523,147 * | 8/1970 | Hold et al. | 264/464 |
| 3,541,473 | 11/1970 | Schlicke et al. | 333/12 |
| 3,573,676 | 4/1971 | Mayer | 333/79 |
| 3,594,492 | 7/1971 | Bahder et al. | 174/36 |
| 3,668,574 | 6/1972 | Barlow | 333/95 S |
| 3,769,618 | 10/1973 | Freedman et al. | 333/84 M |
| 3,865,466 | 2/1975 | Slaughter | 350/96 B |
| 3,886,506 | 5/1975 | Lorber et al. | 333/96 |
| 4,010,315 | 3/1977 | Mildner | 174/107 |
| 4,017,344 | 4/1977 | Lorber et al. | 156/52 |
| 4,038,489 | 7/1977 | Stenson et al. | 174/70 R |
| 4,054,365 | 10/1977 | Marx et al. | 350/96 B |
| 4,079,192 | 3/1978 | Josse | 174/126 CP |
| 4,097,119 | 6/1978 | Kumamaru et al. | 350/96.23 |
| 4,114,121 | 9/1978 | Barlow | 333/95 R |
| 4,125,741 | 11/1978 | Wahl et al. | 174/120 SC |
| 4,153,332 | 5/1979 | Longoni | 350/96.23 |
| 4,156,104 | 5/1979 | Mondello | 174/70 R |
| 4,157,518 | 6/1979 | McCarthy | 333/237 |
| 4,158,478 | 6/1979 | D'Auria et al. | 350/96.23 |
| 4,180,699 | 12/1979 | Hochella | 174/126 CP |
| 4,199,224 | 4/1980 | Oestreich | 350/96.23 |
| 4,278,955 | 7/1981 | Lunden | 333/33 |
| 4,301,428 | 11/1981 | Mayer | 333/12 |
| 4,308,421 | 12/1981 | Bogese, II | 174/32 |
| 4,327,246 | 4/1982 | Kincaid | 174/36 |
| 4,371,742 | 2/1983 | Manly | 174/36 |
| 4,376,920 | 3/1983 | Smith | 333/12 |
| 4,383,725 | 5/1983 | Bogese et al. | 339/99 R |
| 4,461,923 | 7/1984 | Bogese, II | 174/36 |
| 4,528,516 | 7/1985 | Hill, III | 330/254 |
| 4,533,790 | 8/1985 | Johnston et al. | 174/115 |
| 4,538,023 | 8/1985 | Brisson | 174/115 |
| 4,546,210 | 10/1985 | Akiba et al. | 174/114 R |
| 4,549,042 | 10/1985 | Akiba et al. | 174/114 R |
| 4,642,417 | 2/1987 | Ruthrof | 174/36 |
| 4,684,766 | 8/1987 | Tanaka et al. | 174/115 |
| 4,695,127 | 9/1987 | Ohlhaber et al. | 350/96.23 |
| 4,697,051 | 9/1987 | Beggs et al. | 178/63 D |
| 4,755,629 | 7/1988 | Beggs et al. | 174/34 |
| 4,761,519 | 8/1988 | Olson et al. | 174/107 |
| 4,793,686 | 12/1988 | Saito | 350/96.23 |
| 4,793,954 * | 12/1988 | Lee et al. | 264/444 |
| 4,807,962 | 2/1989 | Arroyo et al. | 350/96.23 |
| 4,852,965 | 8/1989 | Mullin et al. | 350/96.23 |
| 4,896,939 | 1/1990 | O'Brien | 350/96.23 |
| 4,907,855 | 3/1990 | Oestreich | 350/96.23 |
| 5,042,904 | 8/1991 | Story et al. | 385/105 |
| 5,068,068 * | 11/1991 | Furusawa et al. | 264/442 |
| 5,069,840 | 12/1991 | Arnott | 264/69 |
| 5,122,924 | 6/1992 | Okumura | 361/330 |
| 5,131,064 | 7/1992 | Arrovo et al. | 385/102 |
| 5,132,488 | 7/1992 | Tessier et al. | 174/34 |
| 5,149,915 | 9/1992 | Brunker et al. | 174/36 |
| 5,177,809 | 1/1993 | Zeidler | 385/105 |
| 5,187,329 | 2/1993 | Bleich et al. | 174/113 R |
| 5,202,064 * | 4/1993 | Furusawa et al. | 264/444 |
| 5,208,426 | 5/1993 | Kennedy et al. | 174/36 |
| 5,220,297 | 6/1993 | Cowhurst | 333/32 |
| 5,251,238 | 10/1993 | Menk et al. | 375/106 |
| 5,262,234 | 11/1993 | Minor et al. | |
| 5,262,592 | 11/1993 | Aldissi | 174/36 |
| 5,271,876 | 12/1993 | Ibar | 264/22 |
| 5,323,420 | 6/1994 | Asprey | 375/4 |
| 5,334,271 | 8/1994 | Bullock et al. | 156/51 |
| 5,349,133 | 9/1994 | Rogers | 174/36 |
| 5,360,998 | 11/1994 | Walling | 307/91 |
| 5,374,782 | 12/1994 | Taylor et al. | 174/130 |
| 5,379,006 | 1/1995 | McCorkle | 333/26 |
| 5,414,211 | 5/1995 | Chan | 174/36 |
| 5,418,878 | 5/1995 | Sass | 385/101 |
| 5,430,256 | 7/1995 | Taylor | 174/128.1 |
| 5,448,669 | 9/1995 | Dunn et al. | 385/101 |
| 5,467,420 | 11/1995 | Rohrmann et al. | 385/101 |
| 5,481,635 | 1/1996 | Arroyo et al. | 385/103 |
| 5,495,547 | 2/1996 | Rafie et al. | 385/101 |
| 5,519,173 | 5/1996 | Newmoyer et al. | 174/113 R |
| 5,539,851 | 7/1996 | Taylor et al. | 385/101 |
| 5,543,092 | 8/1996 | Ibar | 264/40.1 |
| 5,565,653 | 10/1996 | Rofidal et al. | 174/113 R |
| 5,568,486 | 10/1996 | Huscroft et al. | 370/94.2 |
| 5,574,250 | 11/1996 | Hardie et al. | 174/36 |
| 5,574,260 | 11/1996 | Broomall et al. | 174/102 R |
| 5,587,692 | 12/1996 | Graham et al. | 333/12 |
| 5,597,981 | 1/1997 | Hinoshita et al. | 174/110 R |
| 5,605,707 | 2/1997 | Ibar | 425/144 |
| 5,606,151 | 2/1997 | Siekeirka et al. | 174/113 R |
| 5,608,832 | 3/1997 | Pfandl et al. | 385/112 |
| 5,619,607 | 4/1997 | Djupsjobacka | 385/129 |
| 5,656,872 | 8/1997 | Lee | 307/91 |
| 5,658,406 | 8/1997 | Walling et al. | 156/51 |
| 5,665,936 | 9/1997 | Sawamura et al. | 174/32 |
| 5,705,201 | 1/1998 | Ibar | 425/130 |
| 5,719,933 | 2/1998 | Welch | 379/379 |
| 5,734,126 | 3/1998 | Siekierka et al. | 174/113 R |
| 5,742,002 | 4/1998 | Arrendondo et al. | 174/29 |
| 5,750,931 | 5/1998 | McGregor et al. | 174/100 PM |
| 5,777,273 | 7/1998 | Woody et al. | 174/113 R |
| 5,778,128 | 7/1998 | Wildenman et al. | 385/123 |
| 5,932,149 * | 8/1999 | Schneider | 264/1.29 |

OTHER PUBLICATIONS

Middleton, W.I.: Davis, E.W., "Skin effect in large stranded conductors at low frequencies", *Journal of the American Institute of Electrical Engineers*, Sep. 1921, pp. 757–763. Conductor.

Manneback, C., "An integral equation for skin effect in parallel conductors", *Journal of Mathematics and Physics*, vol. 1, (1922), pp. 122–146. Conductor.

Dwight, H.B., "Skin effect and proximity effect in tubular conductors", *Transactions of the American Institute of Electrical Engineers*, (Feb. 1922), pp. 189–198. Conductor.

Zinn, M.K., "Wave propagation over continuously loaded fine wires", *Bell System Technical Journal*, vol. 9 (1930) pp. 189–206. Conductor.

Green, E.I.: Liebe, Curtis, H.E., "The proportioning of shielded circuits for minimum high frequency attenuation", *Bell Systems Technical Journal*, vol. 15 (1936) pp. 248–283. Cable.

Scheikunoff, S.A., Odarenko, T.M., "Crosstalk between coaxial transmission lines", *Bell Systems Technical Journal*, vol. 16 (1937) pp. 144–164. Shield.

Booth, R.P.: Odarenko, T.M., "Crosstalk between coaxial conductors in cable", *Bell Systems Technical Journal*, vol. 19 (1940) pp. 358–384. Shield.

Clogston, A.M., "Reduction of skin effect losses by use of laminated conductors", *Bell System Technical Journal*, vol. 30, #3 (Jul. 1951) pp. 491–529. Conductor.

Raisbeck, G.."Attenuation in continuously loaded coaxial cables", *Bell Systems Technical Journal*, vol. 36 (May 1957) pp. 361–374. Conductor.

Raisbeck, G.: Manley, J.M., "Transmission characteristics of a three–conductor coaxial transmission line with transpositions", *Bell System Technical Journal*, vol. 37, #4 (Jul. 1958) pp. 835–876. Conductor.

Jacobs, I., "The non–uniform transmission line as a broadband termination", *Bell Systems Technical Journal*, vol. 37, #4 (Jul. 1958) pp. 913–925. Conductor.

Barlow, H.E.M., "Screened surface waves and some possible applications", *Proceedings of the Institution of Electrical Engineers*, Part III, vol. 112, #3, Mar. 1965, pp. 477–482. Conductor.

Casimir, H.B.G.; Ubinck, J., "The Skin Effect, Part 1", *Phillips Technical Review*, vol. 28, #9 (1967). Conductor.

Casimir, H.B.G.; Ubnick, J., "The Skin Effect, Part 2", *Phillips Technical Review*, vol. 28, #10 (1967). Conductor.

Barlow, H.E.M., "Hybrid TEM–dual surface wave in a coaxial cable", *Proceedings of the Institution of Electrical Engineers*, Part III, vol. 116, #4 (Apr. 1969) pp. 489–494. Conductor.

Nakahara, T.; Tsukamoto, A., "Transmission and mechanical properties of protected optical fibers for use in optical–fiber cables", *Proceedings of the Institution of Electrical Engineers*, vol. 123, No. 6, pp. 603–608 (1976). Electro–optical.

Metzger, A.B.; Cohen, Y.; Rangel–Nafaile, "Inhomogeneous flows non–newtonian fluids: generation of spatial concentration gradients", *Journal of Non–Newtonian Fluid Mechanians*, 5(199), pp. 449–462 (1979). Plastics.

Military Study, *MIL–C–85485A Military specification cable, electric, filter line, radio frequency absorptive*, Naval Air Engineering Center, ESSD, Code 93, Lakehurst, N.J. 08733 (1981). Shield.

Ibar, J.P., "Control of Polymer properties by melt vibration technology: A review", *Polymer Engineering and Science*, vol. 38, No. 1, pp. 1–20 (Jan. 1998). Plastics.

Nass, R.; "The Future of the Set–Top Box Is Still Clouded by Uncertainty", *Penton's Embedded Systems Development* (Oct. 1998).

Steinberg, S.; "Living Room LAN", *Wired*, pp. 79 (Aug. 1998).

Solomon, D.; "Digital Housekeeping Companies are Working on Ways to Link Home Appliances", *San Diego Union–Tribune* (Aug. 23, 1998).

Ballart, R.; Ching, Y.; "SONET: Now It's the Stranded Optical Network", *IEEE Communications Magazine*, vol. 29, No. 3, pp. 8–15 (Mar. 1989).

Niday, T.; "HDTV and The Mediaprocessor—The Future is Now", *Broadband System & Design*, pp. 16.

Bannan, K.; "PCTV—Cheaper Alternative than HDTV?", *Interactive Week*, pp. 8 (Nov. 2, 1998).

Deo. F.; Reitmeier, G.; "An Overview of the ATSC Digital Television Standard and Its Impact on Broadband Systems", *Broadband Systems and Design*, pp. 13–15 (Nov. 1997).

Eddy, C.: "Watch Out, Here Comes ISP–TV!", *Broadband Systems and Design*, pp. 17–18 (Oct. 1998).

Cervenka, D.: "HDTV, Vortex of Uncertainty for Cable", *CED*, pp. 31–35 (Aug. 1998).

Netravali, A.: Haskell, B.: *Digital Pictures, Representation, Compression and Standards*, $2^{nd}$ Ed., Chap. 9, pp. 628–629.

Bow, K.: "Most wireline public network operators have at least two things in common: They are steadily moving to–or have already developed–fiber networks, and they are increasingly sensitive to maintaining service reliability in an increasingly competitive environment", *Telephony*, pp. 15–18 (Nov. 16, 1998).

Tsaliovich, A.: *Cable Shielding for Electromagnetic Compatility*, Chap. 3, pp. 131–229 (Van Nostrand Reinhold, 1995).

Paul, C.R., *Introduction to Electromagnetic Compatibility*, Chap. 10, 11, pp. 491–666 (Wiley & Sons, 1992).

Lewis, C., *Cisco TCP–IP Routing Professional Reference*, pp. 29–10 (McGraw Hill, 1998).

Barlow, HEM; "High–frequency coaxial cables", *Proceedings of the Institution of Electrical Engineers*, vol. 115, No. 2 (Feb. 1968).

\* cited by examiner

ELECTRICALLY OPTIMIZED HYBRID "LAST MILE" TELECOMMUNICATIONS CABLE SYSTEM

CROSS-REFERENCE TO RELATED APPLICATIONS

This application is a divisional of U.S. patent application Ser. No. 09/124,958, filed Jul. 29, 1998, now U.S. Pat. No. 6,091,025. This application claims benefit of provisional application Ser. Nos. 60/054,076, filed Jul. 29, 1997, 60/084,200, filed Apr. 30, 1998, and 60/085,195, filed May 12, 1998.

Development of this invention has not been supported by any United States federal program and the US Government has no rights in this invention.

TECHNICAL FIELD

The invention relates to telecommunications cabling, and more particularly to the cabling employed for the so-called "last mile" connection of users to external networks. The invention especially relates to improvements in cabling structures and connections.

BACKGROUND

An examination of existing legacy land line communications networks in light of communications technology evolution leads to some interesting insights. On the one hand, the newest long haul communications and information infrastructures being built today are based on fiber optic and coding technologies which are capable of immense capacity. On the other hand, the "last mile" local drop to the end user is typically still the legacy copper line installed decades ago for telephone service. Because the legacy copper lines were designed for performance that did not contemplate today's fiber optic capabilities, the copper line end users cannot avail themselves of the high bit rates that modem long haul infrastructure can provide. The user is limited by his local drop connection to the service provider.

Looking at the communications system architectures currently being pursued by service providers, nearly all suffer from implicit assumptions that preserve the notion of connection based service. Both of these background aspects are discussed below.

The "Last Mile"

The use of telecommunication resources has moved well beyond mere telephone calls. These voice communications messages are no longer the dominant kind of information flowing through the world's communication networks. Telecommunication users today utilize these resources for many other forms of information. Computer data and video are just examples of the future. Users are requiring that their communication link to the global networks rise to the occasion in terms of bandwidth, that is, digital data rate capability. The legacy links as well as the architecture of the central office (telephone exchange) and its cable to the user cannot deliver the information capability desired for all this data, video and other information.

There is a need for new network architecture that provides a broad bandwidth path to the user which can fulfill both present and future requirements. For any such new cable system, suitable bandwidth should be provided for today's end user with an electrical signal interface—not optical—while at little additional cost allowing the capability for optical signal transfer for that time when both the equipment and the end user's bandwidth utilization needs evolve. For the present, and the near future, the largest user bandwidth generally required (even for two-way communications) may still be contained within an interface providing a total channel capacity of under one Gigabit per second. Relatively short spans are required to connect from any local distribution nodes of a new network. Certainly most such cable runs are well under the mile distance of the "Last Mile" appellation that has been applied to this class of cable system, and most of those runs (or local drops) will be well under a half mile. Such new networks' distribution "backbone" linking nodes may be well served by two-way fiber optic channels connecting many nodes envisioned for such a regional network. With the advent of digital signal transmission technology, the performance requirements for these local drops, or "last mile" legs of the cable system, present new and quite different objectives than have been addressed by the prior art. It is also possible that with an insightful electrical design, such a last mile cable may even be suitable for some short-haul inter-node links.

The cost of installing any cable system to individual users—not the cable itself—is substantial and is by far the largest portion of the network investment required of service providers. It is highly desirable if not essential that any new installation of such drop cables provide for future growth in capacity.

A Paradigm Shift in Network Architecture

Past communication networks have been almost entirely based on a "call" or "message" type of traffic where users were connected only transiently to the network while "calling" or being "called." Such connection based architecture established a temporary connecting path between caller and receiver. In the future, communications will be based on the "packet" switching principle. A packet message carries address information so that the sender gets the message to the receiver and vice-versa. All users may be continuously connected to such a new network. Users will elect to actively participate and produce information "messages" only when they wish. The majority of activity in such a network will exist with data flowing, if only intermittently yet with great frequency to and from the user in a fashion not requiring the presence or active participation of the user. This kind of function more resembles the supply of electric power to users than the present call or connection based communication function except that such messages also originate from the user's installation as well as coming to the user from diverse sources foreign to the user's location. This represents new uses of communication processes to accommodate such functions as exemplified by network "agents" or "avatars" which operate independently delivering information whenever their function requires. Similarly the user's system may originate information as a result of similar programming. "Passive" (i.e., non-user attention demanding) functions may in the very near future become the dominant volume of information traffic to be carried by the network.

Such a future requires significant increases in data rates. For example, in 1997, the entire volume of information flow in all long lines occurred with a rate of something just under $1 \times 10^{14}$ bits per second. It is likely that in just a few years one billion users may be connected by networks at which time the global information rate may approach $1 \times 10^{19}$ to $1 \times 10^{20}$ bits per second!

Although much of the fiber now in place in the world is dark, data rate growth will eventually present challenges. The use of wavelength division multiplexing ("WDM") in the optical carriers employed for fiber, as well as optical amplifiers and dispersion correction, can increase their capacity by several hundred times. Even so, large amounts of new fiber will be required to support ever larger and more ambitious applications. This will simply further aggravate the need for substantial bandwidth at the user's end of network systems. Improvements to meet this need must deliver hundreds of Megabits per second, in send and receive modes, and preferably in duplex, i.e., simultaneously sending and receiving.

Many needs, unique to the last mile cable system, significantly affect the feasibility of last mile designs and influence its cost, durability and reliability. Present communication systems are capable of providing only limited bandwidth to the user even though their backbones in long distance and most local inter-exchange paths are fiber based systems. Existing fiber paths have generally utilized only a very small portion of the information bandwidth potential of such fiber paths. The technology of 1997, for example, as mentioned above, provides the opportunity of sending many signals over a single fiber and of having each of those signals carry 10 to 20 Gigabits per second.

The optical fiber is presently in place; only the "terminal" connection is required to achieve such a result. Presently, some "Common Carriers" have been installing such bandwidth enhancing means on their networks' long haul portions just to handle their current and projected loads. There still exists considerable bandwidth capacity latent in those paths; however, little or no feasible technology presently exists to deliver substantial two-way bandwidth at the user terminal end of existing communication networks. Further significant is the current status of fiber use: most of the fibers now installed are dark. That is, they are in place but carry no signals. Present bandwidth limitations lie simply in the means to deliver the existing and the latent long haul bandwidth locally to the entire public at the same time.

SUMMARY

The present invention addresses the manufacture and design of novel cable systems and related systems equipment for providing the last leg of a cable system linking users to a wired communication network capable of providing any user with greatly increased capacity and versatility over that presently available from common carriers. The subjects addressed herein relate to the actual physical link that must be employed to connect a user to a network system.

The present invention allows for future growth. As noted above, the cost of installing any last mile cable system to individual users is so substantial that any such new installation should provide for future growth. The incorporation of optical fibers into such local drop cables is essential to provide a true future growth option. Again, the cost of the optical fiber itself is relatively low adding little to the overall initial cost.

A well-engineered cable system design capable of combining both wide bandwidth electrical and optical signal paths in a hybrid configuration thus becomes of exceptional value in the rapidly evolving communications field. If all local drops could be so constructed, present needs would be fulfilled and easy future expansion to optical use would be available when needed. With the advances provided by the invention, it is feasible to view this kind of new network construction as an infrastructure investment of long term worth—it can provide information highways as solid and durable as were the Roman roads.

The invention addresses physical and functional telecommunications delivery requirements by achieving a hybrid electrical/optical signal transmission cable system having broad electrical bandwidth appropriate for current and near-term foreseeable communications needs, along with a capability to accommodate optical fibers for the future. In this invention's cable system design, there may be a number of optical fibers present in each user's connection to the system. Anywhere from a few to possibly sixteen or more fibers may be readily accommodated without disturbing the cable system's electrical signal performance. The electrical signals contemplated range in frequency from DC to about one Gigahertz (GHz) or even more.

This novel cable system possesses two independent electrical paths, one for sending, the other for receiving. Both the sending and receiving signal paths have equal performance and accomplish their equivalent signal performance without interference of one with the other. The conceptual architecture of this new system emphasizes the maintenance of "four wire" connection, i.e., separation of the sending and receiving paths. Such architecture eliminates many problems of echo, return loss and "singing" that complicate present distribution systems. This new cable system is intended to service the full range of current and future needs. For example, the invention may accommodate Internet users, digital TV, high definition television (HDTV), multi-channel video-on-demand, high-capacity digital information exchange, work-at-home and telecommuting communications, myriad home and office services via "agents" and "avatars," automated manufacturing control, video "telephony," commercial and private video conferencing, high volume library file transfer and search, as well as multiple voice frequency "phone" service channels. Number portability (as in a transportable individual "phone number" which goes with a user wherever they go), now so highly sought, becomes a simple derivative of the nature of the Synchronous Digital Hierarchy/Synchronous Optical Network (SDH/SONET) signaling basis employed by the disclosed last mile system.

Many such applications require very broad bandwidth in both directions. The hybrid cable system design may serve all classes of users from the few who demand optical broad bandwidths here and now to the vast majority of currently much less demanding users. For the latter, a high quality electrical signal path with a Gigahertz or less bandwidth, far exceeding the capability of existing telephone wire pairs, will be adequate until they embrace, in the future, the more demanding applications.

An example configuration of the present invention is shown in FIG. 2, which shows in a schematic form a local node-to-user interface. Referring to this figure, a local node 51 is shown with inputs from two-way optical fiber paths 53. The nature of this local node is described in more detail below. These may conveniently be links of optical paths using SDH/SONET format. Additionally, through the use of wavelength division multiplexing a single fiber path may serve hundreds to thousands of drops. Another input 55 is shown for a possible Plain Old Telephone Service (POTS) path. Further, a power source 57 is connected to the local node. This may be a battery backup source within the node or coming from another place in the system. Within the local node 51, a node interface device ("NID") 59 couples the sending and the receiving channels to the fibers. The basic channel of an NID includes an optical receiver connected to the receiver fiber path and an optical transmitter connected to the transmitter fiber path. Each of these opto-electric elements provide a number of user channels (typically 16 to 32). The node interface device can accommodate both an electrical mode 61 and an optical mode 63. A similar user interface device 65 is connected at the user end. A hybrid cable according to an embodiment of the present invention is connected between the node interface device 63 and the user interface device 65 and is denoted here with the numeral 67. The user interface device may have outputs to a computer, a television, telephones, data inputs, etc. Numerous other drops may also be provided, these represented schematically by the numeral 69. FIG. 2a shows a regional ring architecture which may employ the present invention. Starting from a global network or backbone 411, the initial connection is made to a switching and transfer point 401. The backbone 411 is typically fiber optics but may also employ electrical cabling. The switching and transfer point 401 is connected to a plurality of local nodes 51. One exemplary local node is 51'. In FIG. 2b, local node 51' is connected to a plurality of networks. One network serves the business district 403. Another network serves the shopping mall 405. Another network serves an industrial park 409. Still another network serves a plurality of neighborhoods 407. Each of these networks may connect to the local node 51' via cables 413. Cables 413 may employ the cable of the present invention. At the local node 51' a node interface device 415 is shown. At the network such as the industrial park, a user interface device 417 is shown. These interface devices are described above and in more detail below.

It should be noted, however, that the regional ring architecture according to FIG. 2a may take many forms. For example, if a cable 413 services a single house, there may be a switching and transfer point at the house entry that distributes the signals from the cable to a plurality of rooms or devices. In the former case, each room may be equipped with a local mini-node that services the appliances or devices within. Moving a device from one room to another may only require resetting of dip switches or moving jumper cables. As noted in more detail below, nodes or mini-nodes may be located by addresses inserted in signal headers by the user interface device. In particular, for use in houses, cables of the type described below may be employed, but with less shielding and strengthening materials, such as stainless steel braid. In this fashion, the cables may be made more compact, which is desirable for in-house applications.

A typical distance from a node to a user will be generally less than 2000 feet and in dense urban areas commonly less than 1000 feet. The hybrid cable system design of the subject invention may even be operated so as to allow its two pairs of electrical conductors to be used for two POTS lines, which may be used concurrently with wideband electrical operation. Of course, the fiber channels remain independent of the manner used for any electrical mode. These electrical lines may also serve to carry the very modest amounts of power needed to operate various last mile in-line signal regenerators and possible network devices for user terminal equipment, yet may still function without interfering with the ringing and "battery" voltage functions in a POTS operation. POTS functions may be better served by using the digital paths to provide one or even a multiple number of "phone" lines via a digital to voice interface "line card" in the user interface device.

The node system above would likely best employ the signal format of SONET or SDH standards now widely employed by the existing interoffice and long haul optical networks. This new cable system is thus highly forward and backward compatible. This again addresses an important cost/investment issue. The existing telephone copper-wire network ("outside plant") comprises more than three-quarters of the total present investment in existing local telephone network systems.

Reviewing the foregoing technical analysis of objectives and principles concerning the last mile cable system has led the inventors to a new form of shielded quad electrical conductor configuration and system elements, as well as the architecture to utilize it. This new cable also readily accommodates a number and variety of optical fibers in novel ways. The quad principle, fully realized, provides the dual (two) independent non-interfering sending and receiving electrical signal paths so essential for the last mile local drop. A quad cable concept is not new of itself, but this disclosure addresses many other factors which, by improving the realization of its potentials and extending the flexibility of the configuration, allows achievement of all the other characteristics required of last mile cable systems including optical fiber paths.

The present invention also discloses new structure, particularly suited to achieving the precision required in a quad geometry chosen for low cross-talk (XTLK) across the objective wideband electrical performance spectrum. The invention's cable system structure provides novel methods for inclusion of diverse optical fibers.

The present invention also discloses new techniques for enhancing the effectiveness of protection from electromagnetic interference within the invention's cable systems.

Unique performance advantages emerge from the novel balanced electrical source and load termination devices disclosed and which may readily be incorporated into in-line digital signal regenerator modules.

A novel armular conductor construction is also disclosed which enhances electrical signal performance and improves EMIR performance. Novel and economic methods of manufacture for the new quad configuration are further disclosed which also achieve exceptional accuracy and stability of the mechanical structure.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10b shows a cross section of one wire within the annular conductor of FIG. 10a.

FIG. 11 shows a schematic form of the cross-section of an individual conductor within the annular conductor assembly shown in FIG. 10a.

Like reference numbers and designations in the various drawings indicate like elements.

DETAILED DESCRIPTION

System and Interfaces

Figure 1A:
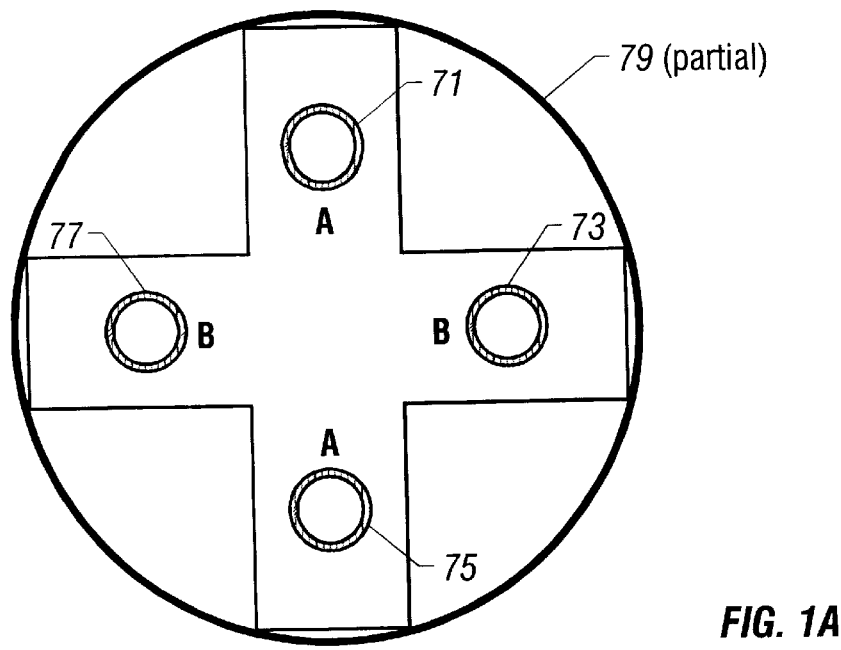
FIG. 1a is a diagrammatic view showing a quad annular conductor center support which maintains precision in conductor location within a cable and in relation to the outer shield.

Referring back to FIG. 2a, in which the system of nodes is shown schematically, the fiber optic ring contains the many fibers of the regional system. Each such fiber path should follow a ring topology so that it physically goes in two directions from each node, ultimately connecting with the regional STP (Switch Transfer Point) 401 shown schematically in FIG. 2a. The system may be a duplex path design so that there are separate transmitting and receiving paths throughout. At least two of the fibers in the bundle of fibers shown schematically would interface with any particular node 51. For example, as shown in greater detail in FIG. 2b, the Fiber Interface Device (FID) 60 couples its optical receiver 61 and its optical transmitter 62 to their respective receiving and transmitting optical fibers 53. These elements of an FID are a shared resource for the channels fed by one such FID within a node. Any one of the FID's in a node may serve from 16 to 64 dual data paths. The node may contain as many FID's as needed for the number of users to be served. The number of users per FID depends upon the level of multiplexing of the SDH transport carrier used. For example, STS -384 (20 Gbs) provides 32 channels of STS-12 (622 Mbs). A single node might serve 3200 users within its economic range, if its "last mile" runs were economically short.

Figure 2:
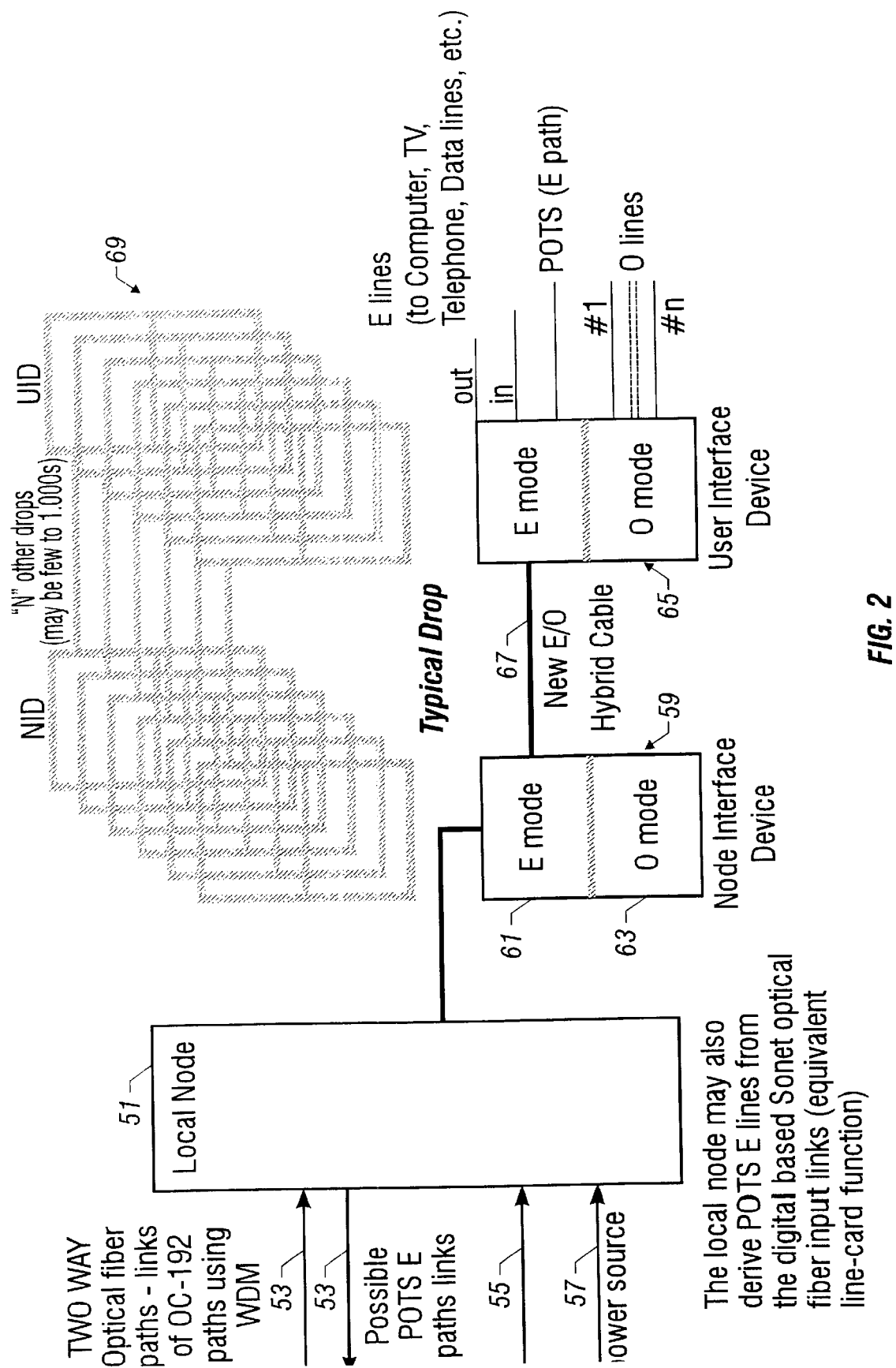
FIG. 2 is a block diagram of an organization of a local node serving multiple users via the novel cable design with two way full bandwidth electrical or optical paths. Shown also is the possible use with POTS service.
Figure 2A:
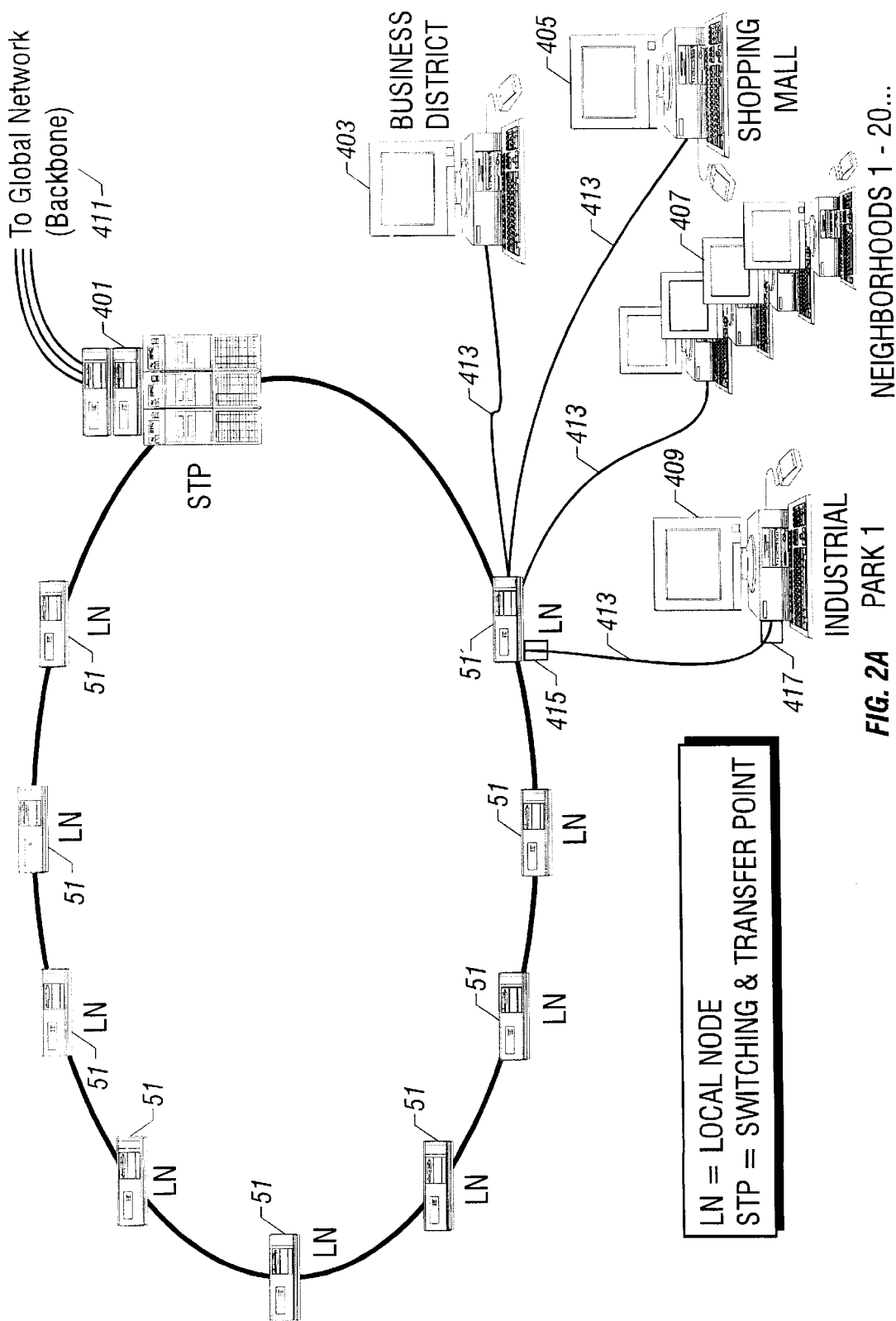
FIG. 2a is a diagram of the organization of a regional communications ring employing the novel cable design for the "last mile" connection to the end users.
Figures 1, 2B:
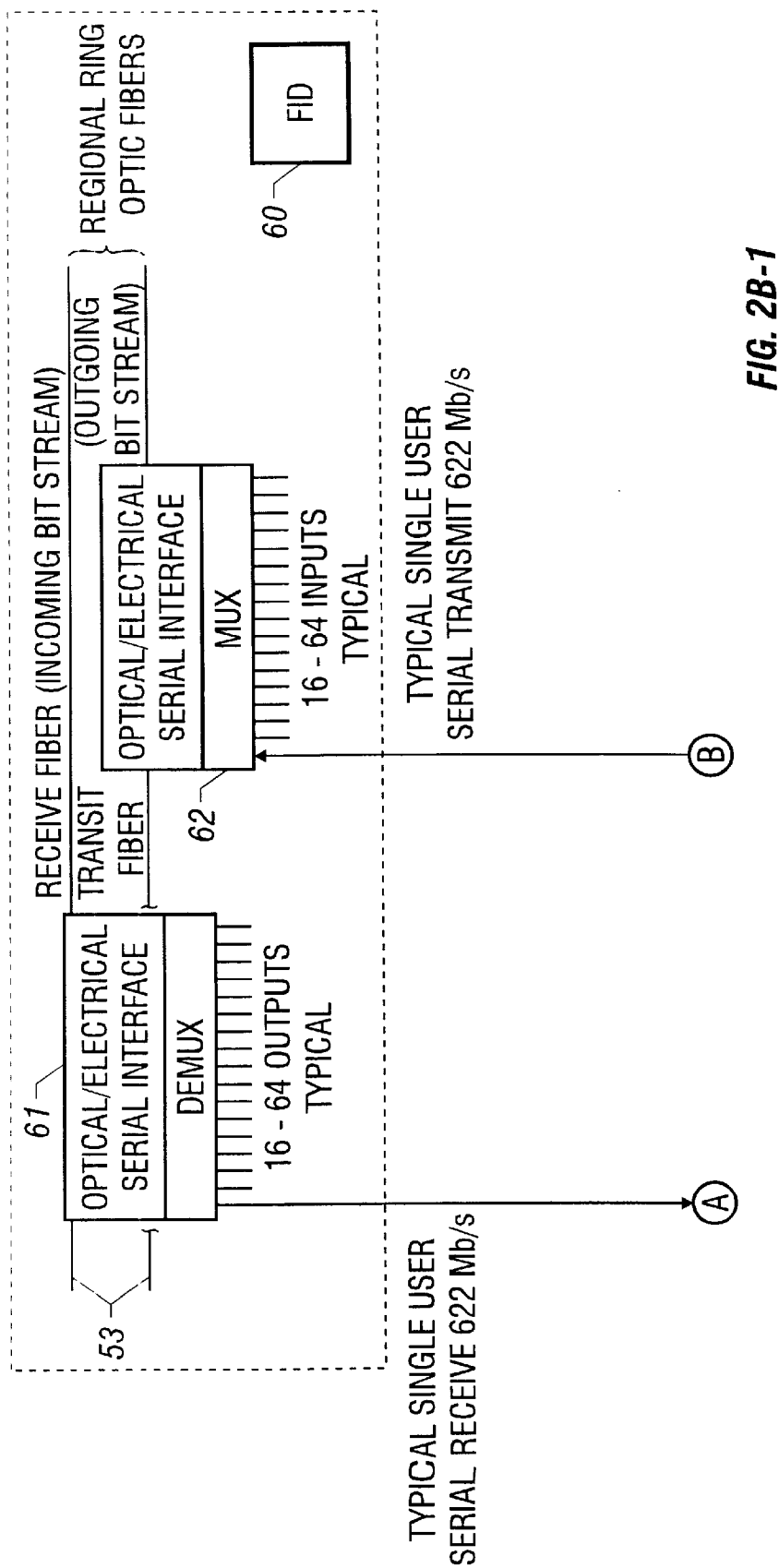
FIG. 2b (2b-1 and 2b-2) is a schematic block diagram of a fiber interface device and of a node interface device.
Figures 2, 2B:
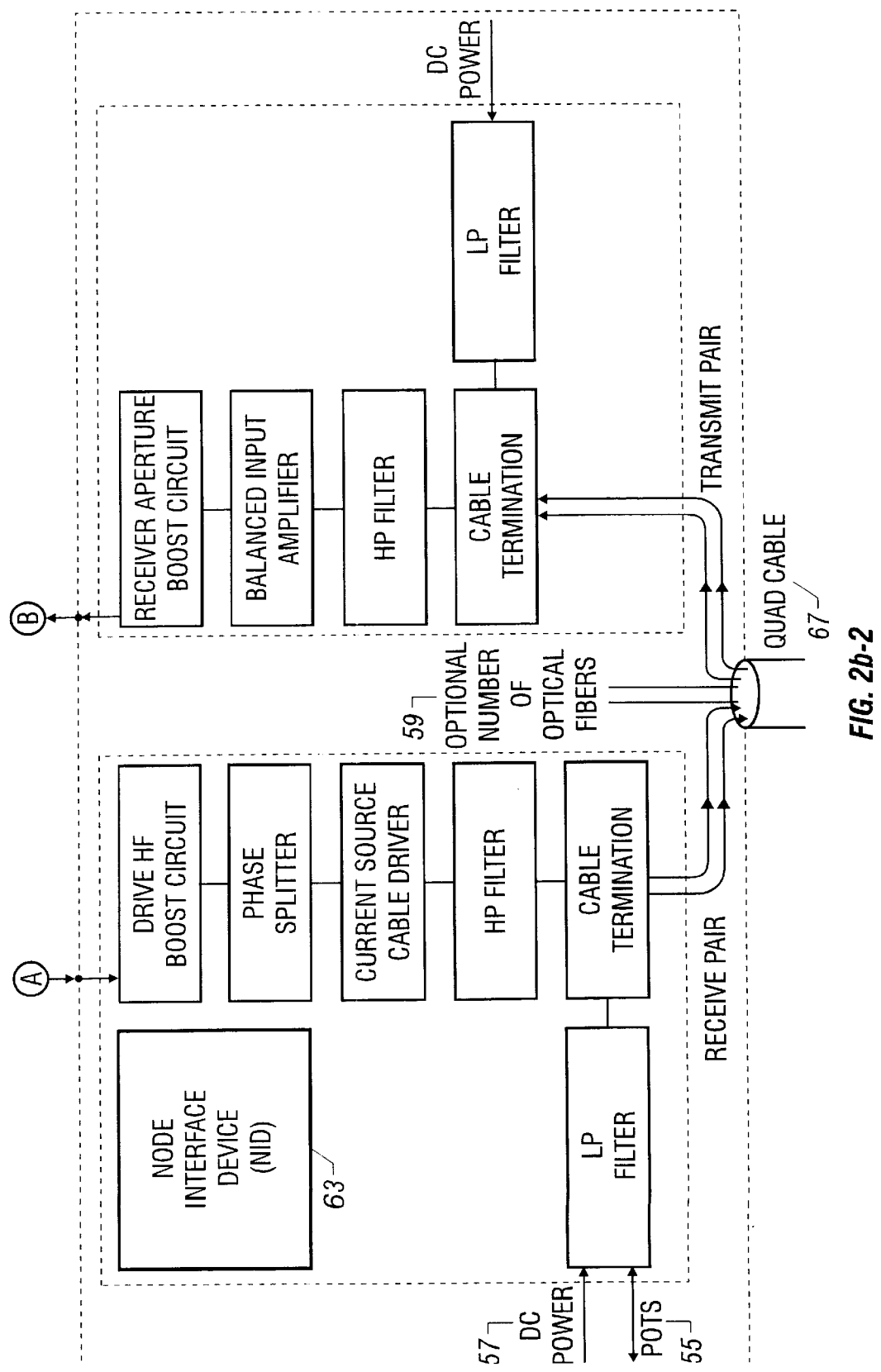

The FID 60 and NID 63 elements can be modular in physical character and a node housing can be designed to accommodate substantial capacity additions where that seems desirable. The regional fiber bundle ring runs can also be specified to contain additional uncommitted fiber for further expansion of the users served by the system. A single node site may, in this way, be accommodating of expansion of users by connecting more of the fiber bundles of the ring to added FID and NILD elements. FIG. 2b, of course, is a non-limiting case showing just one possible FID with just one typical user path NID connected to it. The receive optical/electrical serial interface 61 may be a fiber optic SDH wideband optical receiver of only limited sensitivity since the fiber cable runs will, in general, be fairly short—just around the regional ring. The demux and mux circuits may use one the variety of chips or chip sets now generally available for SDH. For example, the Vitesse Semiconductor Corp. chip set VS8021/8022 is an example that may be used for fiber data rates up to OC-48, and Triquint Semiconductor can supply a demux mux chip set package that operates at the 10 Gbs rate.

The NID contains those elements of the system that are responsible for coupling the physical cable to the FID and hence to the overall network system. The two separate paths are shown in FIG. 2b NID 63 includes those portions that couple the serial receive path from a demux output to the receive pair of cable 67 and also couple the transmit pair of the cable 67 to one of the serial transmit inputs of a mux circuit.

The drive boost circuit of the receiver portion of the NID and the receiver aperture boost circuit of the transmit path are adjusted by the installer to give the clearest "eye" pattern and optimum BER (bit error rate) when the system is installed. The termination resistors on both transmit and receive pair terminals are impedance matching devices to minimize the reflections at those points. The current source driver appears to the system as an infinite impedance in all states of driving (i.e., bit high, bit low and transitions). The HPF and LPF elements help to isolate the DC power from the active signals. Perfection of the cable balance is complemented by having the current source driver phase balanced to the drivers and by having the balanced input amplifier highly rejecting of any common mode signals at the respective pairs. The optical fibers contained in the "Last Mile" cable are not utilized in either of these schematic FIG. 2b or FIG. 2c. They are shown in both figures as available fiber ends for future applications.

Figures 1, 2C:
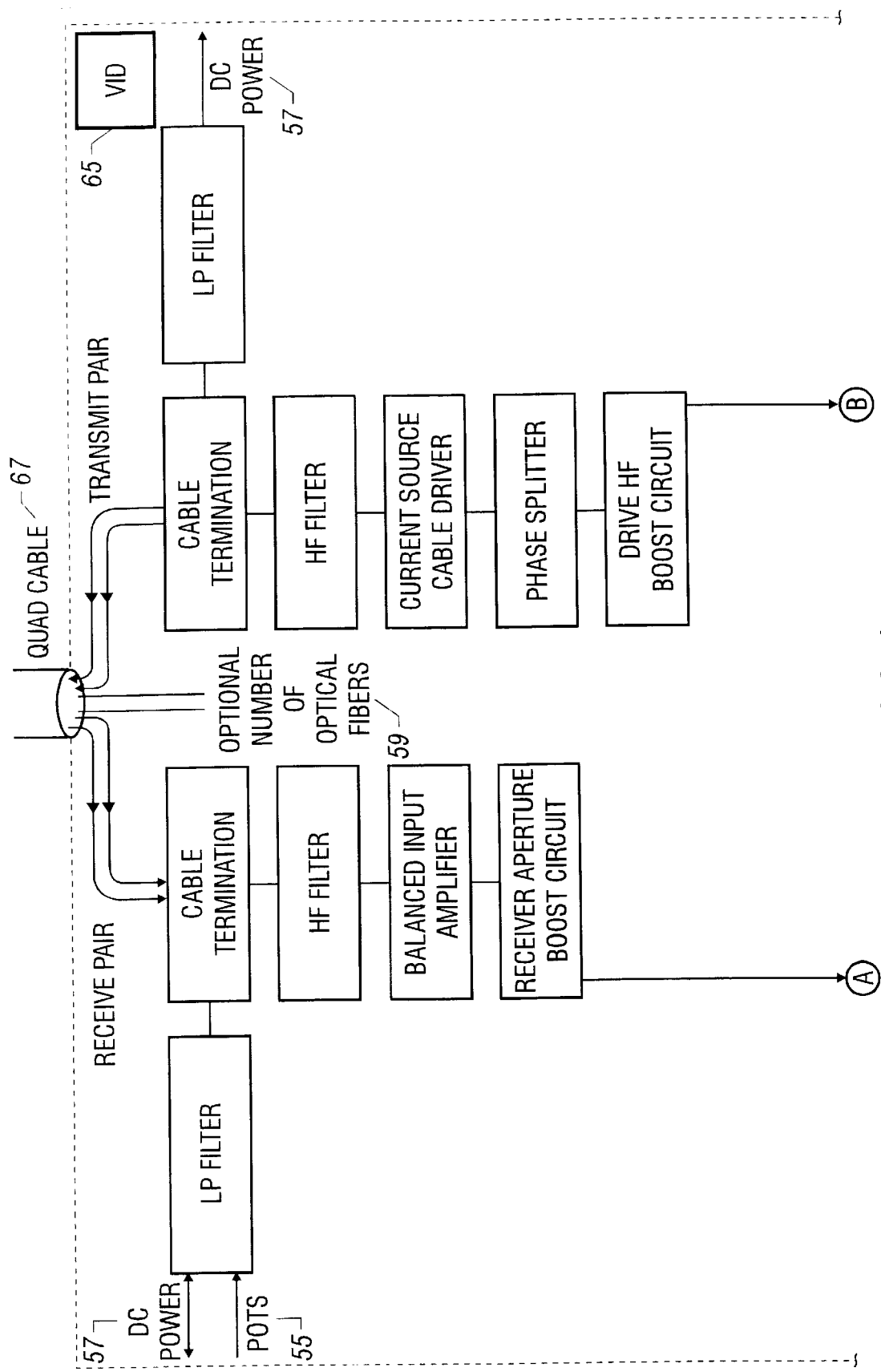
FIG. 2c (2c-1 and 2c-2) is a schematic block diagram of a user interface device.
Figures 2, 2C:
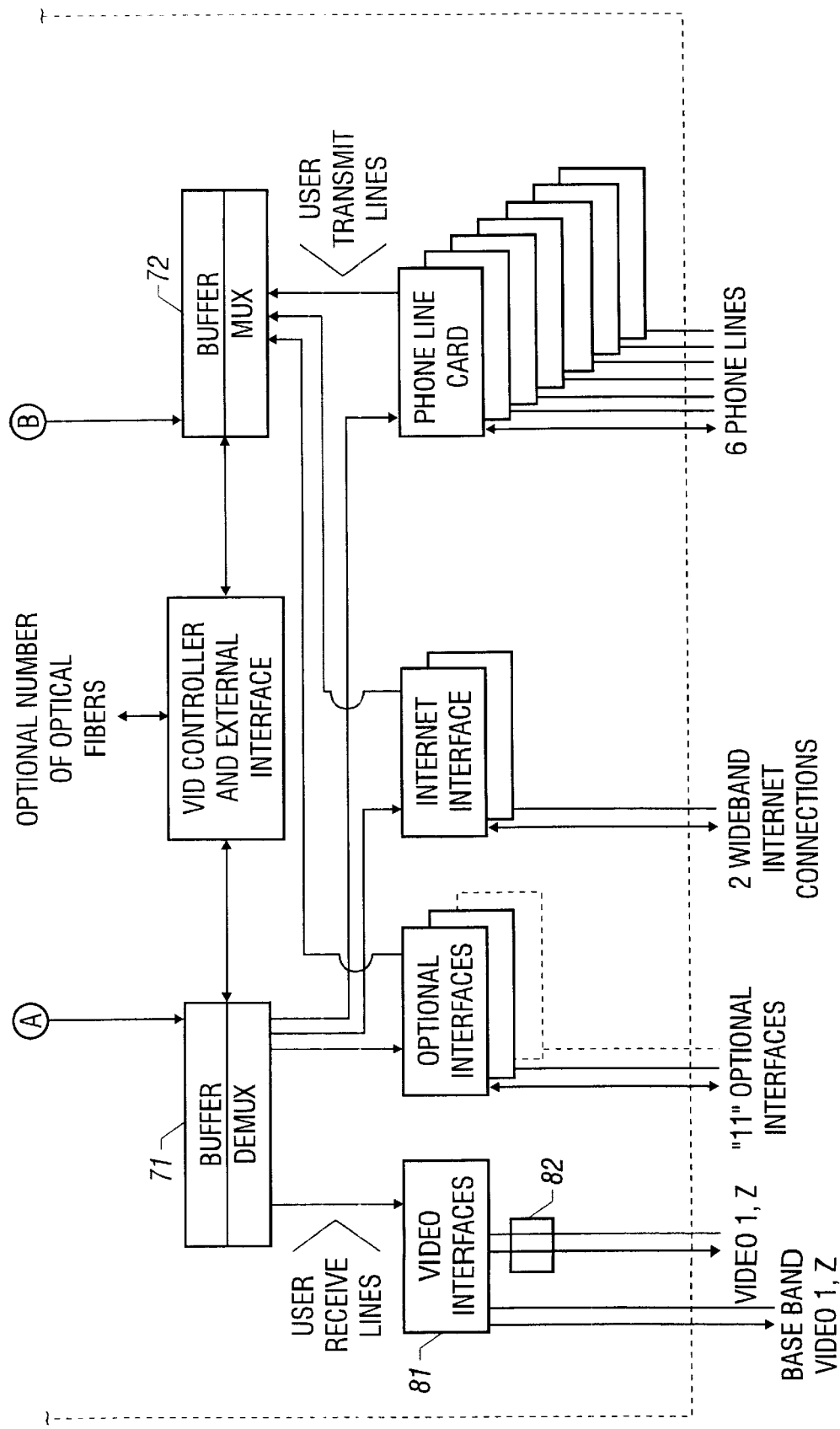

The UID is shown schematically in FIG. 2c. The cable 67, in this figure, represents the same cable 67 (the opposite end) shown in FIG. 2b. The example signal envisioned for each of the dual paths is a 622 Mbs SDH-like bit stream. The receiving and transmitting paths, processed at the cable wire pairs, end in a manner similar to the circuit function of FIG. 2b. Those elements operate similarly up to the buffers 71, 72 of demux and mux elements. These demux/mux elements operate in a manner similar to the higher speed circuit shown in FIG. 2b but at the lower speed of the individual user bit stream—622 Mbs. They function to distribute the appropriate cells of the SDH frame to the functions assigned by the system design. Of the many possible such assignments, a typical selection is shown in FIG. 2c. The UID controller may be a microprocessor or a computer. The UID controller also may put software headers on signals routed to various devices attached to the node or mini-node. Similarly, headers may be placed by the UID on signals sent upstream to the NID and FID to indicate where the signals should be sent as well as the nature of the signals.

There are two video paths for the user. Each of the two are available as baseband video or as an RF signal suitable for existing TV receivers. These outputs may be connected via BNC jacks or the TV RG-59 cable connectors commonly used on TV sets. Of course, to connect a digital UID to an analog television requires a video interface 81 (FIG. 2c) which may employ a digital-to-analog converter 82. Converter 82 may convert digital television signals to a form appropriate for analog televisions. Converter 82 may be, e.g., a separate line card. The assignment of the digital data rate for this function may be any desired level of use of the channel capacity; however, about 100 Mbs for each may be optimal for the system, permitting quite high resolution video to be transferred. The program choice in such a system is made by transmitting to the network instructions for the source and the program desired. Additionally, sources may also permit the user to specify the duration wanted. Such instructions would be sent on one of the sending interfaces by means of a simple keypad entry system. Were it desired to only receive a "broadcast" type of video transmission, the user would simply enter the "channel" number of the program desired. This operates as what has been called video-on-demand. The STP of FIG. 2a is the point in the system at which these functions of switching and selection may be executed. The system allows many service providers to deliver their offerings via the system. The number of possible selections is as large as the number of possible addresses.

Two internet paths may be provided, each of wideband capacity, which may be 10 Mbs, 45 Mbs, or even more depending on the requirements of the user and the ability of the ISP to provide the data rate, although this choice is arbitrary. This bandwidth would use only a few percent of the available capacity of a dual 622 Mbs system and is typically 400 times more capacity than the current best telephone modems.

The interface mechanical connection may be one of the standard computer formats such as a 1394 serial buss. The digital paths may be addressed to any Internet Service Provider that connects with the system. The reach of such sources is considerably extended by the SDH based format which enables communication with sources at any point in the global network irrespective of distance, since the digital format does not deteriorate with distance to any significant extent.

The system is shown with six phone lines that connect with the digital network via the SDH signals paths. The "line card" elements supply the common 48 volt DC current loop to the standard telephone and also provide the 20 Hz ringing function and the voice digitizing receive and transmit paths. The line card outputs may be RJ-11 type standard telephone hardware.

Signal Considerations and Performance Requirements

Several major performance requirements are important for a network local drop cable system according to an embodiment of the present invention. Optical path transmission losses will be very small for even the longest of such local drops. Little else can affect the optical signals, short of physical damage from weather, water or the ever present squirrels that seem to favor cables for gnawing. However, in the electrical cable mode—for wideband use—the most significant performance limitations depend primarily on how well a cable system performs with respect to these three major signal corrupting factors:

1) Cable system transmission loss and delay time properties, particularly at the highest frequencies (HFTL).

2) Electromagnetic Interference Rejection of the cable system's shielding of the signal paths (EMIR).

3) Cross-talk between the sending and the receiving paths (XTLK).

In prior art engineering efforts, the main thrust with electrical communication cable systems was devoted to obtaining low transmission losses over as wide a bandwidth as possible. The need for very low transmission loss arose from the analog modality that dominated those past information transmission methods. As the analog signals were repeatedly amplified after losing power in each few miles leg of their journey, the signal to noise ratio degraded. The longer the runs and the more equipment traversed, the greater the possibility for cross-talk and interference noises entering the signals. With the development of modem information theory, the advantages of digital signal transmission became clear. This new understanding, along with the digital error correcting coding which became possible, revolutionized communication system design ideas. As a result, the employed hardware techniques changed radically and rapidly. For example, in 1997 virtually all communication channels employed digital techniques, at least in the inter-office and long-haul portions of their paths. In the analog days, the main concerns were signal to noise deterioration and the increase in other noises (distortion and cross-talk) with the distance the signals traveled. Modem digital systems essentially do not deteriorate in that manner even when challenged by the distance of circling the world. Once in the digital domain, the rules for the cable system transmission requirements definition change radically.

Signal transmission loss and high frequency roll-off (HFTL) are not judged by themselves but rather in relation to two other factors:

1) the amount of internal noise energy in the system and, 2) the ratio of the signal energy to the other two corrupting energies, EMIR and XTLK.

It is relatively easy to correct even substantial loss or high frequency roll-off and delay dispersion which is reasonably stable or changes only slowly over time. A portion of these problems can be overcome by adaptive equalization of the system response. As such, even large bandwidth can be sent over even a fairly a lossey cable system. Adaptive equalizers or other "matched filter" signal correctors are a part of most modem signal terminal equipment such as the ubiquitous personal computer modems that enable telephone communication of data. Since virtually all the information to be communicated in any new system will be of a digital form, reliable processing of the signal information reduces to the equipment's ability to reasonably differentiate between a "one" and a "zero" by means of a signal detector or discriminator. Loss of signal level or high frequency response defects are further overcome provided the signal is only moderately corrupted by noise, jitter, interference, and/or cross-talk. The binary digital signal can be completely regenerated with such a signal detector thus restoring peak signal power well above the noise and crosstalk at the position in the path at which this is done. Thus signal to noise ratio (S/N) becomes a first and a most important part of any new "last mile" cable system specification. This S/N behavior is dominantly a result of the cable system's abilities to reject interference (EMIR) and to minimize cross-talk (XTLK) between the sending and receiving links within the cable system. The novel quad configuration of this disclosure addresses the needs in these factors allowing substantial run lengths before such regenerator action is required. Modem integrated circuit technology allows such devices to be made small enough and cost low enough that they can be incorporated into the cable in a small pod hardly bigger than the cable diameter. The disclosed system employs such techniques to provide substantial margin in performance over the varied noisy environment confronting today's networks.

Signal Power

A practical amount of signal power is not likely to be a serious barrier as the following demonstrates. To estimate the amount of signal power required in the electrical or analog aspect of the signaling system for good communication function, the first factor to be considered is the minimum internal noise that a system may have. The internal noise power in excess of the irreducible thermal noise at the receiver input terminals sets the lower limit on any system's noise level. This measure can be expressed in a form independent of the system's working bandwidth by an "Equivalent Input Noise Temperature Figure". As a good way to quantify this parameter, one first measures the system noise energy output when fed at the input from a known hot temperature source resistor, then in a second measurement connects that input to a known much colder temperature (electrically equivalent) resistor. Comparing the resulting ratio of the two output power levels to the known ratio of the noise power in the hot and cold resistors sources allows the contribution made by the system internal noise to be properly accounted for. The thermal noise power in each of the two test resistors is in direct proportion to their absolute temperatures, thermal noise power being $4kT$, where $k$ is Boltzman's constant and $T$ is the absolute temperature in degrees Kelvin. The difference between the known source hot/cold ratio power ratio and that measured at the system output is an excellent, accurate measure of how much noise the system adds to the signal input. When viewed this way, a typical wideband electrical system will have a "noise floor" which is well under a value that is 10 dB more than that of a room temperature source resistor.

In real world working systems, local drop cable system design should only allow the level of corrupting energy from EMIR and XTLK to add relatively little to the system noise floor. For example, a very good cable system performance in EMIR and XTLK may hold such signal corruption to a value not over 10 dB more than the proposed system noise floor of +10 dB. The required power for the signals can then be calculated by defining the working bandwidth and the minimum system S/N:

1) A desired S/N may be, e.g., 50 dB which would provide a very low bit error rate for even the most demanding uses.

2) The bandwidth may be 1 Gigahertz.

The required power may then be computed as follows: The total noise power is the sum of the Noise Figure, EMIR feedthrough and XTLK. The exemplary value assumed was 20 dB over thermal noise. Ambient thermal noise ($4kT$) is approximately $1.65 \times 10^{-20}$ Watt per Hertz bandwidth, which is increased 100 times by the +20 dB noise assumption and further increased by the system bandwidth so that total system equivalent input noise power becomes $1.65 \times 10^{-20} \times 10^2 \times 10^9 \times 1.65 \times 10^{-9}$ watts. For a 50 db S/N, signal power must be raised above this value by 50 dB ($10^5$ times=$1.65 \times 10^{-4}$ watts of signal power). Thus needed signal power is only a very moderate 0.165 milliwatts (−7.8 dBm).

Even assuming the EMIR and the XTLK to have a much larger level of, say, +30 dB (instead of just +10 dB) over the practical noise floor described, the system would still need only a small level of signal power, just +12 dBm or about 16 milliwatts. This larger, but still very modest power level, would require barely a 1.3 volt signal across the nominal electrical transmission impedance of the invention's cable example (about 100 ohms). Such numbers represent a lower power per unit of bandwidth than the kinds of signal energy levels employed in older analog voice frequency drop circuits, which as a class have much poorer system power efficacy. Older analog systems often used a standard of operation of −8 dBm signal power (about 0.16 milliwatt) in a 10 kilohertz bandwidth. If such a low power efficacy were used for the above example's 1 Gigahertz bandwidth, then signal power needs would leap to +42 dBm or about 16 watts (a power density of 16 nanowatts per Hertz bandwidth). Even the noisier digital system example (+30 dB interference) operates with a thousand times more effective use of signal power (only 16 picowatts per Hertz). These cable system examples did not account for any losses in the cable system nor for any high frequency response roll off. Some such losses and roll off will occur and can be easily compensated for by boosting both level and frequency response at the signal transmitter and correcting the balance of deficits with a similar boost in the response of the receiving system. If, as is generally the case, most of the flat loss and high frequency roll-off also operate on the corrupting EMIR and XTLK, then those factors will not so much affect the S/N. This approach has worked reasonably well in practical systems. In the foregoing example, a very conservative 50 dB S/N was used and did not consider the extremely important role that error correcting coding would play in producing an adequately low level of signal corruption. Error correcting coding typical of SONET or SDH systems used by the majority of the world's digital communication systems would not require nearly so good a S/N, 30 dB being sufficient for trivial errors in most any application. Adding to this repertoire of enhancements the use of digital signal regeneration, performance can be designed for a very high level indeed with only modest use of regenerators. In any good system design, noise immunity will be the major limitation. In these examples, there is much room to adjust to any real system demands. The larger issue for the "last mile" cable system is the EMIR and the XTLK affects which good design must effectively address. It is from those kinds of signal corruption that existing telephone outside plants ("copper wire pair" cable) develop their fatal limitations, resulting in the obsolescence mentioned above. Such older cable systems cannot provide the multitude of users with sufficiently wideband signals because of excessive problems from XTLK and EMIR.

Energy Losses and HFTL

If the insulation material used in a cable design is selected from the better modem plastic materials for the frequency range below 1 GHz, the HFTL of small diameter cables is primarily controlled by the cable conductor losses, which at high frequencies are dominantly the result of "Skin-Effect" in the conductors.

Skin-effect has long been known in the art. The apparent resistance seen by alternating current flowing on (or in) a conductor rises substantially above a conductor's DC resistance. The describing equations show that for frequencies above a value inversely related to the diameter of such a conductor, the effect becomes significant. It appears to cause current to flow more and more only within a shallow depth at the conductor surface as the frequency employed increases. For conductors of very large size such effects are apparent even at power frequencies (50 Hz). The earliest investigations, beginning in the 19th century, arose because of the unexpectedly high losses found in large AC power transmission cable systems. In smaller conductors, skin effects become quite significant in the megahertz range. In normal conductor material (e.g., copper), the majority of the current flows in only a thin layer ("skin") of less than a few thousandths of an inch. This approximated thickness is proportional to the reciprocal of the square root of the current's frequency, thus decreasing in relative skin depth to one tenth for an increase of one hundred in the frequency used. The "skin depth" is considered to be that depth at which the current has become 1/e (about 37%) of the total current value. For non-magnetic copper conductor material (relative permeability=1), a commonly used engineering formula for calculating skin depth is:

d=2.6*(f)–0.5 where d is in $\frac{1}{1000}$ inch (mils) and f is the frequency in megahertz (MHz).

F d

@ 1 MHz 2.6 mils;

@10 MHz, 0.822 mil;

(100 MHz 0.26 mil;

@1 GHZ 0.082 mil

Skin effect has been analyzed in various ways but prior art analyses share an important fundamental flaw. They lack a causal basis, failing when considering an AC current rapidly initiating from a zero current condition. A different approach, on which some aspects of this invention may rely, begins by considering the skin effect as arising from a process of propagation of electromagnetic energy into the highly conductive medium of the conductor. An initial current must propagate into the conductor in order to be conducted.

It is therefore necessary to consider the skin effect as a process arising from need of wave propagation rather than quasi steady state concepts which become difficult to rationalize for high frequency phenomena and especially signal propagation in cables. (One skin effect survey reference is: H. B. G. Casimir and J. Ubbink, a three part paper in The Philips Technical Review, 1967, Vol. 28, nos. 9, 10 and 12.)

In an electrical communication cable system, the energy flows through the space in the cable as well, only working with conductors at the cable's spatial boundaries. Viewed this way, the conductors operate much more like mirrors than as conductors of the energy. This perspective will be more fully described as the cable system construction of the invention is detailed below. Of necessity, for mechanical reasons, the space within the cable must be filled with some insulating substance. That substance also must not have a dissipative resistance or disturbing effect to the flow of electromagnetic energy or it will produce losses of energy or spreading of the energy in time. Such insulating materials (e.g., dielectrics) can have high frequency losses and many materials do. Microwave ovens rely on such losses to heat and cook. For example, modem plastic materials are available which do not show significant loss in the range of interest here, (below 1 GHz). The kind of thermoplastics available permit economical fabrication methods and have sufficiently low dielectric losses as to allow the loss picture to remain largely the result of the resistive losses in the conductive elements of the path.

In efforts to minimize the skin effect resistance, a technique of redistribution of the current into many small conductors has been used. By employing a large total surface area, it is possible to maintain a practical level of losses when conducting high frequency current. Efforts to accomplish this are exemplified by the development of "Litz" wire and other similar attempts at cabling together many small strands insulated from each other to form a composite conductor wire or cable. Though not at first fully appreciated during the development of such cables, proximity of one strand to another causes the AC magnetic field of each wire to induce an "eddy current" in the adjacent wires thereby diverting current in each wire from the proximate adjacent regions of the strands. This "Proximity Effect" greatly increases the apparent AC resistance such that, at a high enough frequency, advantages of Litz construction are ultimately reversed, becoming poorer than a solid conductor of comparable overall diameter. In other words, a given "Litz" construction may show improvement over some span of frequency but at a frequency just a few times the center of its improvement range, standard Litz cable will become worse than a single solid wire of the same conductor DC resistance. Annular (tubular) conductors made of separate insulated wires minimize loss of conducting material at high frequencies but the adjacent conductors composing it still show some proximity effect. To further combat such proximity problems, transposition of the wires has been used so that the wires follow a reentrant or woven patter breaking up the proximity of one to another. Such schemes have some value over a limited frequency range. Something better is required for a wide wavelength range. Proximity of one conductor to another becomes a limiting problem as th e frequency reaches the tens or hundreds of megahertz range.

Providing Low XTLK—in a Single Cable

Two separate cables might be employed to reduce XTLK between the sending and receiving paths if each path's shielding could be sufficient to avoid interaction. This then places the XTLK burden back on the shielding. Shielding can never be perfect and practical limitations still require rather heavy and stiff structure if high shielding attenuation is the objective. With two cables, this need must be confronted with each one of a pair. Overall cost and weight then increase dramatically and mechanical flexibility decreases. The present invention avoids the problem by its approach of putting both electrical paths within the same cable system (inside the same shield). This new approach unifies provision of cable system shielding function (EMIR) and XTLK by perfecting the symmetry of the novel quad configuration of the invention and by the novel role of the surrounding "shield-like" structure. The role of the shield is then to keep to a satisfactory level the ingress of EMIR, the disclosed system benefiting from the exceptional rejection of the ingressing energy due to the balance with which the true orthogonality of the two paths in the quad configuration is developed. Uniformity of the penetrating fields is provided by the novel jacketing of the cable.

S/N and Regeneration for Digital Signals

The above has demonstrated that the S/N, XTLK and EMIR can be managed particularly well by the novel cable features of this disclosure as explained in detail below. For digital signals, yet another parameter known in the art enhances system performance. With digital signals it becomes possible to regenerate the signal at some distance down the transmission cable where corrupting influences have not become significantly disturbing to the data reliability. This is particularly advantageous with simple binary or nonreturn to zero (NRZ) data. As the discussions regarding signal power have shown, for only modest amounts of power the S/N can be quite substantial. Binary or NRZ tolerate modest amounts of noise, producing trivial data errors. One can therefore place a signal regenerator so that its threshold accurately reads the center of the so-called signal "eye". By avoiding long runs of zeros or ones, the line codes used by SDH/SONET systems, such as B3ZS, readily allow a clock signal to be recovered within such a detector system, which further enhances the reliability of the digital signal detection. Placing such a regenerator system at a point some distance down the length of a cable completely regenerates the weakened signal restoring a large signal to noise ratio. Having such a "fresh start," with much more energy than the attenuated signal at that point, raising the signal's level well above both system noise and the crosstalk (XTLK). Such a regeneration scheme may be employed because, for S/N greater than only 20 to 30 dB, error rates can become negligible in practical systems. This ability may be used in both directions of transmission effectively nullifying a large portion of any signal deterioration at cable lengths where the corruption is manageably small, since the moderate amount of power required for the "clean" new regenerated signal is readily available.

Designers may choose the point at which to make this restoration. Integrated circuits are known to the art and are available in performance suitable for the signal speeds considered. Such devices contain differential mode threshold triggering detectors (having some useful hysteresis) and clocked positioning of the decision threshold to synchronize it with the so-called "center of the eye". A dual regenerator system serving each of the two paths may be fabricated in a very small package even considering the need to protect it from static and electrical discharges. Such a package can be incorporated into the Last Mile cable in a small pod hardly larger that the cable itself. The DC power required for such regenerator system modules can be easily conveyed by the conductors in the cable allowing this regeneration operation to be carried out repetitively even in a lengthy cable run. The use of the cable's electrical conductors to convey system power for other system needs such as keeping the User Interface Device (UID) operational is considered a part of the function of the last mile cable system design. This approach allows the application of this novel cable to be extended to lengths easily able to service typical last mile requirements and to provide a system that functions without reliance on any other source of power which may not be as reliable as that supplied by the network. This reliability requirement is viewed as essential for the high level of continuous use which the system affords to network users.
Structure The invention provides the "last mile" connecting cable system equipping users of networked communication systems with two-way independent electrical paths of equivalent wideband performance as well as providing optical fiber for present and future needs. The quad configuration was chosen because, fundamentally, the two electrical paths can be completely non-interacting. What this demands is simply very good symmetry. Symmetry is the attribute that plays a very important role in both the orthogonality of the two paths (rejection of XTLK) and in each of the path's ability to reject electromagnetic interference.

Figure 1B:
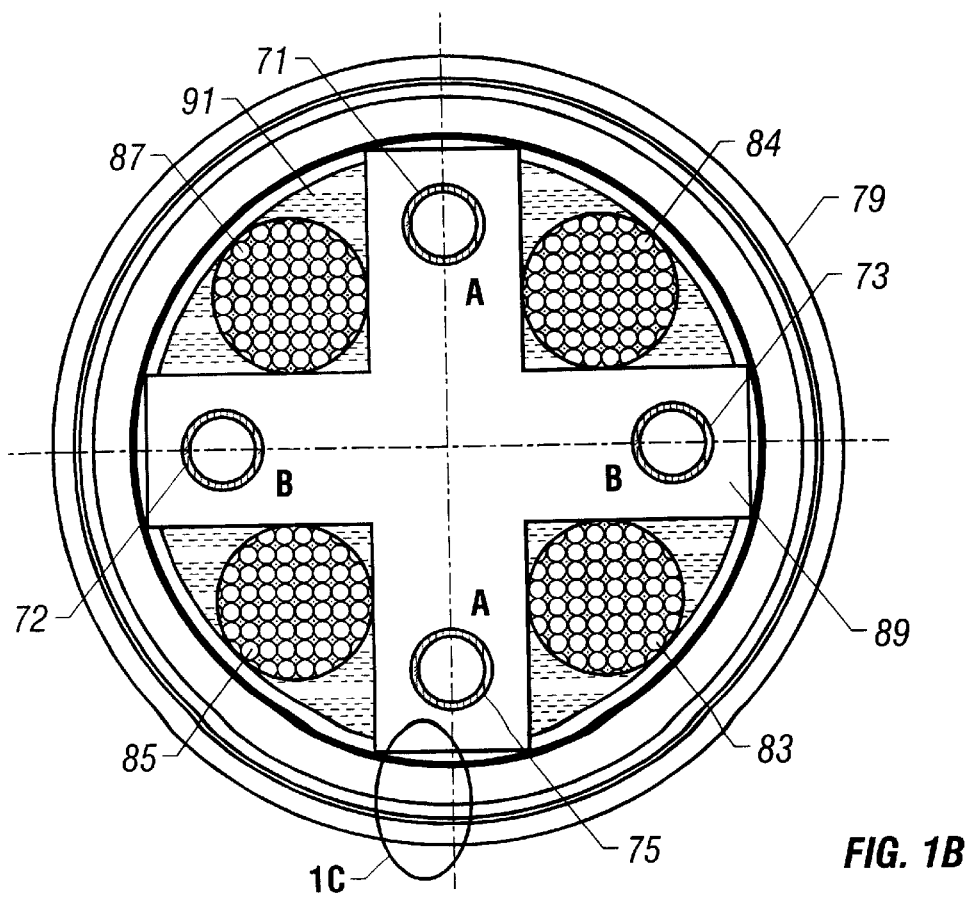
FIG. 1b is a diagrammatic view of one form of a composite cable including fiber optic members.

FIGS. 1a and 1b show in cross-section a general form which such a four conductor novel quad arrangement might take. In FIG. 1a, substantially exact electrical positions should be achieved for each of four conductors 71, 73, 75, 77 and, if a surrounding "shield" conductor 79 is centered and uniform in its electromagnetic properties around the circumference (over the frequencies of interest), then the two pairs will be precisely at a null of induction of one into the other. Since it is the electromagnetic fields of each of the pairs that are of interest, the degree of balance or symmetry achieved can be assessed by measuring the capacitance from each conductor to the shield and to each of the other conductors. The degree of match is a measure of the inductive as well as the capacitive "balance" or symmetry of such an array. Cross talk is then vanishingly small and each of the two pairs can be operated substantially independent of the other. This aspect is what attracts our attention for the two-way two-path broadband system. The method by which this symmetry is achieved includes a specially molded positioner as disclosed below.

FIG. 1b, in more detail, shows a cross-sectional view of a quad annular hybrid cable. The four conductors 71, 73, 75, and 77 are shown as in FIG. 1a. Surrounding shield conductor 79 is also shown, symmetric with the four conductors. FIG. 1b shows buffer channels 81, 83, 85, and 87 which may support one or more optical fibers. A positioner or annular conductor support insulator 89 provides the structure through which conductors 71, 73, 75, and 77 pass. The construction of the positioner 89 is described below.

A filler gel 91 may be employed surrounding each buffer channel 81. The types of filler gels which may be appropriate include superabsorbent compounds such as petroleum-based gels. Such compounds serve at least two purposes. One is to keep the glass fibers contained therein from being corroded by air. Another purpose is to provide lubrication for pulling wires through the cable.

Other advantages accrue with the addition of a twist to the quad internal conductor structure, such that the lengthwise lines of the center insulating and positioning structure and the conductors form a helix down the running length of the cable, say, of one to two turns per foot of cable length. Such a configuration has the useful property that when properly fed from a balanced source and terminated in a balanced receiver, any fields penetrating uniformly to the interior conductors will cause no net current to flow in either pair. The use of twisted pairs is known. However, one advantage to the invention's helical configuration is that the invention's EMIR is enhanced to the same degree that its XTLK is minimized. Thus, in the cable system of the invention, reducing XTLK also lowers unwanted noise ingress of the electromagnetic pollution ubiquitous in modem environments. The "shield's" function in the invention's configuration is not only to attenuate the interference energy but also to symmetrize the electromagnetic transmission of the ingressing fields by distributing that leaked energy symmetrically to the well-balanced interior quad structure.

The quad's balance heavily rejects the energy that does get through. The term "shield" as used herein refers to the behavior of the surrounding structure, not to the common usage which implies simply an energy barrier. Such barriers are always imperfect and some energy always permeates them. This approach of symmetrizing the shield to enhance EMIR is a novel method to defeat the presently growing levels of EMI which are difficult to manage otherwise. The degree of such rejection made possible by the precision structure of the present invention has not been achieved by the prior art known to the inventors which pursued substantial interference rejection even after making extensive use of rather heavy shields in their cable designs.
Inner Symmetrizer Design The invention uses an inner symmetrizer which surrounds the quad cable. Of course, one skilled in the art recognizes that the quad cable is not required. The structures disclosed as surrounding the cables may be employed for dual quad cables, coaxial cables, etc. The inner symmetrizer's structure is shown in cross section in FIG. 1c in one embodiment for a local drop cable system and may be utilized similarly in all the other example drawings. The design of FIG. 1c creates a high degree of symmetry in the attenuated electromagnetic fields that manage to penetrate to the interior of the cable, thereby developing substantially increased rejection over what would previously be accomplished by a brute force shield and without symmetry of the conductors.

EXAMPLE ONE

Figure 1C:
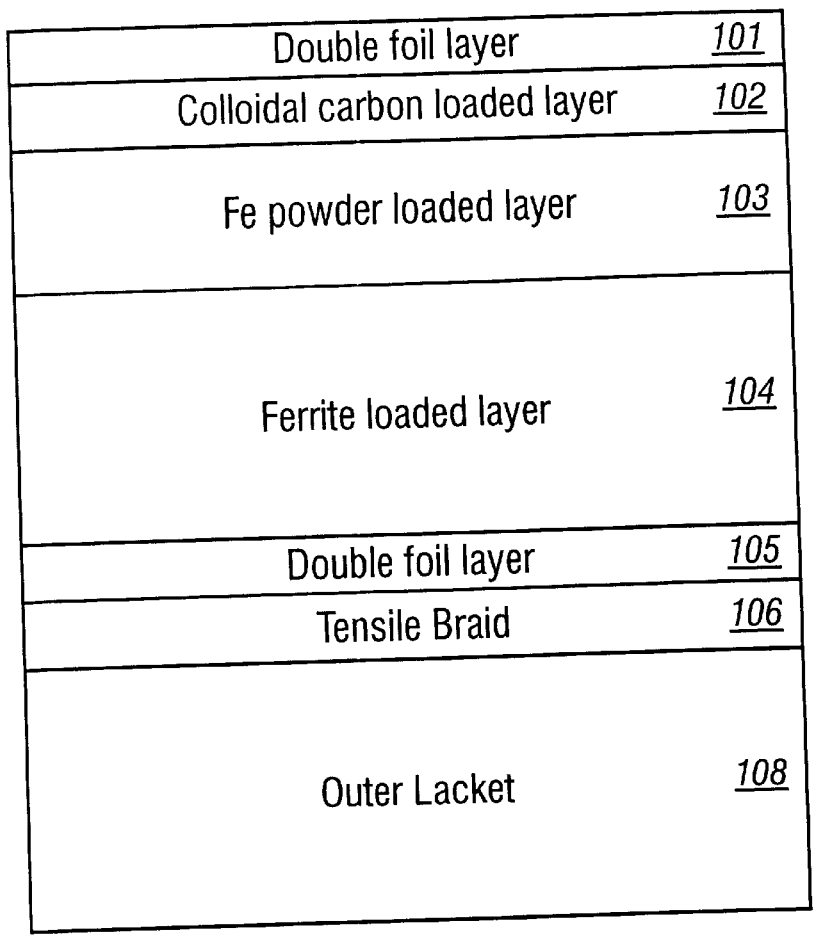
FIG. 1c is a schematic cross-section of a section of the cable wall as located in FIG. 1b.

FIG. 1c shows a schematic cross section of an inner symmetrizer seen through a section of the cable wall as located in the dotted section shown in FIG. 1b. The layers are described starting from the layer closest to the conductors 71, 73, 75, and 77. The function of each of these layers is described following this short reference list. Of course, the following list is merely exemplary. In fact, it is highly specific and variations of these materials may be employed without departing from the spirit and scope of the invention.

| Layer No. | | Thickness (in mils) |
|---|---|---|
| 101 | Two layers of aluminum foil on a plastic carrier, each laid down foil side first, locking the 1 mil aluminum foil together in a half-turn wrap. | 4 |
| 102 | Colloidal carbon in a pliant urethane binder, carbon loaded to 85% by volume in a thorough shear mixing plasticizer then extruded in a uniform film over layer 101. | 8 |
| 103 | Pure iron powder in a pliant urethane binder, loaded and thoroughly mixed as in layer 101 to a volume percentage of about 90% (iron powder from OMG America, Research Triangle Park, NC). | 16 |
| 104 | Ni—Zn ferrite powder (98% of particles under 5 micron particle size) in a pliant urethane binder, mixed as above and loaded to 90% by vol. | 25 |
| 105 | Two layers of locking 1 mil Al foil as in layer 101. | 4 |
| 106 | Stainless Steel tensile braid. | 16 |
| 107 | *(Optional for some constructions) Corrugated Stainless Steel vapor barrier 2.5 mil thick, corrugated with 30 mil deep redges on 45 mil centers. Wrapped and continuously seam welded closed. Wrapped on top of a 10 mil under layer of soft urethane extrusion over the tensile braid to fill and grip the ridges. | 35* |
| 108 | Outer protective extruded jacket. A pliant urethane tough material preferably colored to minimize cable temperature during sunlight exposure. Bonded to the stainless steel braid in the absence of layer 107. | 32 |

The composite jacket may add about 0.210 inches to the diameter of the basic quad OD (without the optional outer corrugated vapor barrier). This yields an overall diameter of about ⅝ for a quad employing a 0.042" finished diameter tubular annular quad conductor which does not require the vapor barrier to protect the optical fibers which the conductors may contain.

The constitutive layers are further described below.

The aluminum foil material 101 maybe backed by a suitable plastic carrier which may be "Mylar" or some other durable material known in the art, suitable for the temperature range and preferably substantially non-hygroscopic. The paired foil wraps should be wound in opposite directions, with each wrap fully contacting metal to metal for about one half turn and folded once on itself. Each of the two different paired layers (101 & 105) may require somewhat different spiraling of the wrap to realize suitable flexing properties. Layers 101 and 105 may, of course, be replaced with alternative forms of conducting materials.

The colloidal carbon or secondary artificial carbon powder material 102 is available from Asbury Graphite Mills, Asbury, N.J., in a particle size under 325 mesh or finer which is sufficiently small to allow complete mixing of the materials with the chosen binder prior to processing it as a covering for the cable. The surface DC resistivity of the mix in the solidified binder should be under 500 ohms per square. Other materials which may be used for this layer include materials with similar conductive properties.

An appropriate carbonyl iron powder material 103 is available from OMG America, Research Triangle Park, N.C. The purest and finest particle size currently offered is K291A and is suitable for this use. In all cases, uniform and thorough mixing with the binder is essential. The pliant urethane materials are available from a variety of sources, for example, a wide variety being offered by the B.F Goodrich Company. Other materials which may be used for this layer include materials with similar magnetic properties.

The high frequency Ni—Zn ferrite material 104 is produced by crushing and then "ball milling" the material in several steps to produce an average particle such that 98% by weight of the resulting particles classify as under 5 microns in size. Suitable materials may have complex permeability suitable for the 100 MHz to 1000 MHz frequency range. Milled Philips Ferroxcube fabricated type 4 materials may be satisfactory for the purpose. It is important to consider the anisotropy in high frequency material permittivity that results from the strong magnetizing field in the range of 0.25 to 0.60 Tesla. Other materials which may be used for this purpose include materials with similar magnetic properties, e.g., remanence, permittivity, and permeability.

The stainless steel braid 106 may be selected from those materials in the strand thickness of 4 to 6 mils which display high tensile strength and little creep for the tension levels typical in outdoor suspended cable use. Other materials which may be used for this purpose include materials with high tensile strength.

The outer jacket 108 may be of a tough polyurethane material extruded at a typical thickness of 32 to 40 mils. Other materials which may be used for this purpose include materials with similar strength properties.

The layers of FIG. 1c distribute the penetrating fields within the cable so that they produce a balanced effect on the signal paths. Layer 101 of this non-limiting example of the technique is present for several reasons. First, it acts as a field mirror for the internal fields of the quad signal pairs. Layer 101 also operates on the external penetrating fields by presenting a conductive field short circuit to the penetrating fields, from layer 102, so that the surface current becomes more equally distributed as the same exit layer 102. Layer 102 has a relatively high resistance compared to the aluminum metal surface of layer 101 which creates a large spreading effect on the field coming from the relatively lossey and resistive material of layer 102. EM wave velocity is relatively high in the material of layer 102 and is made to a thickness that allows significant field redistribution. Layer 102 adjoins a layer region 103 above it which has relatively high permeability (5 to 50 within the frequency range of interest) and a medium conductivity which has a rather low EM wave velocity. The junction with layer 102 creates a further spreading effect. The layer above, layer 104, is chosen to have relatively high permeability in the high frequency region (50–500 MHz) where its EM velocity will be fairly low. As a consequence, layer 104 is somewhat thicker than layer 103. Layer 104 has a significant EM velocity difference at the boundary with layer 103 and the field spreading is thus enhanced. Layer 105 is a thin high conductivity layer that produces the typical field current short as a "shield" but its primary value is in the magnetic coupling to the sub layers for the benefits described, as it will only have a small shielding effect against the external fields. The tensile layer 106 is for strength while at the same time providing some electrical current capture in the braid. Layer 107 (not shown) may also be used instead. The vapor barrier properties of the stainless steel also provide a shielding effect and some tensile advantages. The outerjacket 108 is for weathering protection and other environmental and handling protection.

Each of the foregoing layers may be varied or another layering combination utilized. The principles of the varying of the EM properties in abrupt junctions with differing EM propagation accomplishes a significant symmetrizing effect which is a desired feature. Attenuation, per se, is not a main object of the constructions described.

To evaluate possible constructions one can construct a relatively perfected helical quad line of the type described above and, using it as test device, compare the contributions to the balanced signal transmission through the cable with and without a possible symmetrizing covering of the type described. The differences reflect the relative advantages of the "collimating" or symmetrizing properties.

Outer Impedance-Matching Housing

A second form of outer covering develops some properties rather different from the classical shielding means for the purpose of reducing the effective antenna-like gathering of electromagnetic energy which any conductor line out in a typical outdoor environment will exhibit. Since it is impossible to make a physically realizable "shield" that is not penetrable by electromagnetic fields, the inventors have found another way to achieve reduction in vulnerability to such electromagnetic interference. The symmetry and balance features of the subject cable system design have been discussed. The second approach allows a different factor to be utilized.

Space itself has a characteristic impedance which characterizes electromagnetic field propagation. The resistive component of this radiation impedance is about 377 ohms, a value derived from the ratio of the permittivity of space to the permeability of space (or the inductance and capacitance of space). If the surface of a cable were made to exhibit a resistance to a propagating electromagnetic field which had the same value as that of the same space when unoccupied, then the cable would produce an antenna effect of much smaller area and thereby absorb much less energy than an unmatched good conductor of the same extent as such a cable. The cable's action as an antenna would be substantially less, gathering only due to the energy flowing through little more than its optically apparent projected area. It would, in fact, almost appear to be invisible to a radiating electromagnetic field. Whatever the inner layers of the jacket system may be designed to do, if this effect is present, the shielding effect of other such inner layers will be much enhanced.

Figure 1D:
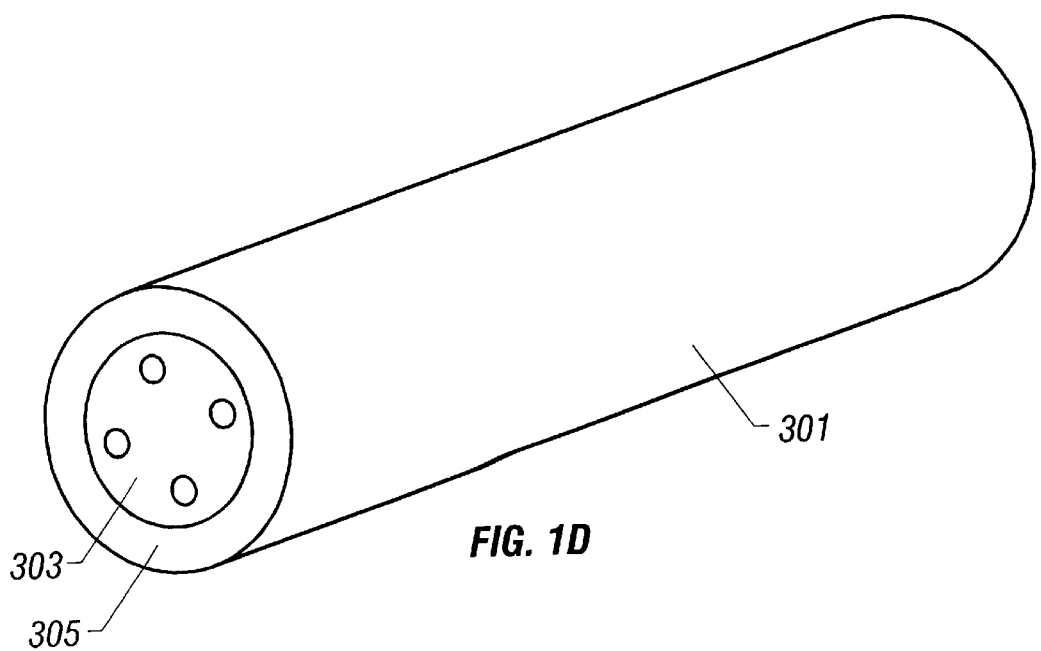
FIG. 1d is a perspective section of a cable according to the present invention employing an outer impedance-matching housing.

This design for a surface or exterior apparent resistance matching the radiation of space is realized using an outer impedance-matching housing according to the invention and is shown in FIG. 1d. Referring to FIG. 1d, a cable 301 is shown with a quad conductor configuration 303. An outer impedance-matching housing 305 is incorporated surrounding quad conductor 303. This outer housing has an apparent radiation resistance matching the radiation characteristics of space and may be realized for a reasonably wide range of frequencies using dissipative loadings in a polyurethane jacket material. Loading with a mixture of artificial graphite carbon particles such as Asbury Graphite Mills (cited above) A99 material (or finer size grades) and metallic powders such as OMG Americas (cited above) AN325 (or finer grades) of ASTM NO2200 class atomized pure nickel powder can provide the requisite radiation dissipative properties.

In choosing materials and combinations for the effects desired in the dissipative resistive match to space of the surface properties of the outer impedance-matching housing, two aspects should be considered. First, there is a method by which one may evaluate material and construction performance in minimizing the impact of a radiating electromagnetic field encountering the material. This is one way one may choose appropriate materials. Using an anechoic room designed for RF fields in the frequency range of interest, one may launch relatively plane wave RF fields at a non-reflecting wall. A directional RF receiver can then be configured to observe the amount of reflected energy returning from such a wall. A pulsed emission and detection can be used to minimize stray returned energy. By placing a metallic conductive object of the same profile as the cable to be evaluated on the same wall, its reflection can be recorded. This test part is removed and the cable with the material covering to be evaluated is placed as was the test piece. The measurement is then repeated. The values so obtained give a relative measure of the degree to which the test material approximates a good match to space. Using such a method or another, one may try other forms of carbon or similar materials which may be employed. For instance, some of the natural or mined flake graphites and/or in combination with other conductive particles or fibers of various metals, for example, with or without very small stainless steel particles or fibers may be well-appropriate. A range of materials exist which may be effective in this manner, in particular, materials which closely approach a match to the properties of space so as to minimize the "pickup" of radiating EM fields for the range of frequencies of interest.

One well known test method for assessing the ability of a cable to not transfer energy from external fields into its signal path is the established "surface transfer impedance" measurement defined in US military specification MIL-C-85485A item 4.7 et al. However, this test does not accomplish its objective (of defining the ingress effects) when confronted by the balanced quad configuration. The test is not even completely adequate in its primary domain of coaxial systems. The concept, if properly applied to the structures of the present invention, would likely show extraordinarily low values of energy transfer as a result of the contribution made by the balance rejection which is well beyond the energy attenuation of the shield itself. For reference to test problems of this MIL specification, and other test problems and issues of cable design and measurement, see the following two references: "Introduction to Electromagnetic Compatibility" by Clayton R. Paul, pub 1992 by John Wiley & Sons, Inc., New York, chapter 10, pages 491–692; "Cable Shielding for Electromagnetic Compatibility" by Anatoly Tsaliovich, pub 1995, by Van Nostrand Reinhold, and in particular chapter 3.

The inner shield layers surrounding the quad configuration serve yet another purpose in acting as an electromagnetic mirror to confine the internal fields of the quad conductors, thus preventing the loss of signal energy. As a further benefit, the conductor structure also reduces signal energy loss by virtue of its more confined propagation. Referring back to FIG. 1c, the conductive layer 101 proximate to the outer surface of the quad's dielectric positioner 89 is designed to minimize such loss. This surface is best proportioned so that the space between it and the quad conductors is substantial in relation to the spacing of the conductor pairs, aiding in the preservation of the precision symmetry and minimizing the influence of the shield ("mirror"). This would be a diameter perhaps as much or more than double the space between a conductor pair. (See Bell System Technical Journal, vol. 15, no. 2, pp 248–83, Estel I. Green, F. A. Leibe and H. E. Curtis).

Figure 13:
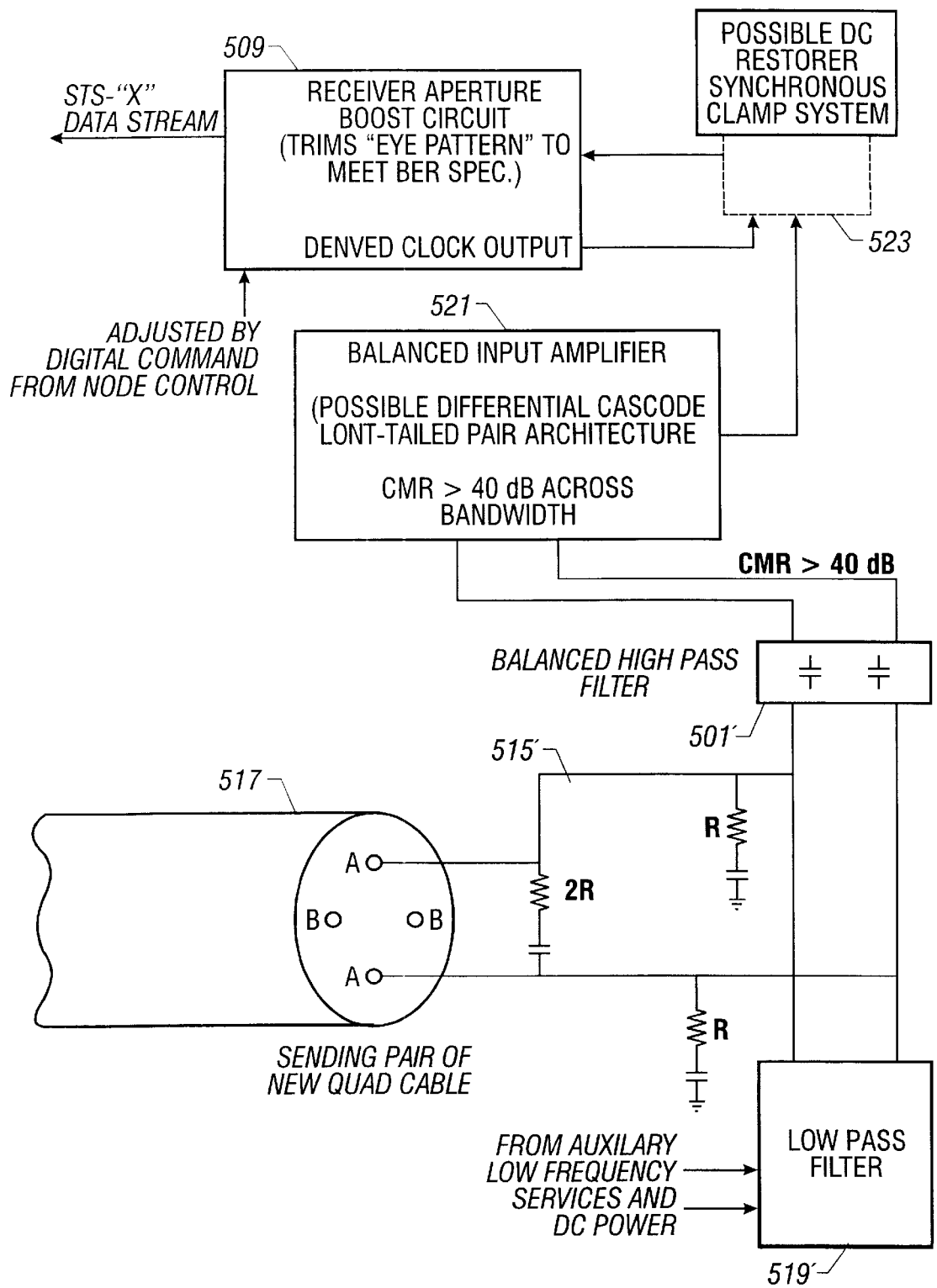
FIG. 13 shows a schematic form of an alternative embodiment of a possible drive and terminating means to achieve a balanced operating condition for a quad cable.
Figure 14:
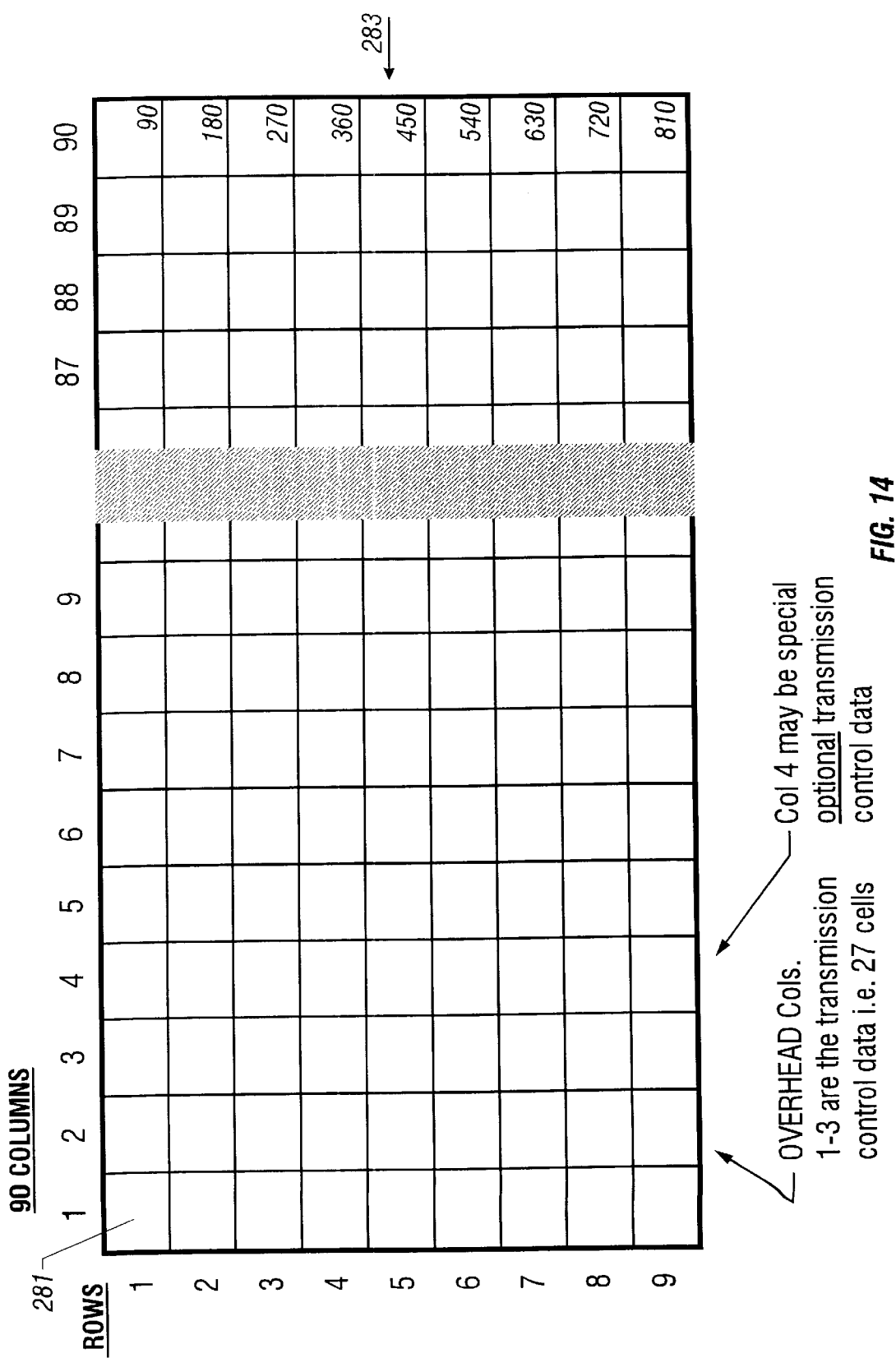
FIG. 14 shows a schematic form of the basic time frame of SONET or SDH transport time division multiplex.

To preserve the inherent balance of the quad, the source and terminating devices are also important. Any significant disturbance of the intrinsic balance of the cable at these ends produces increases in the entry of unwanted energy and additionally adds internal crosstalk between pairs. Some examples of novel balanced-to-unbalanced couplers ("baluns") and cable driving circuits baluns are shown in FIGS. 13 and 14 and form an important part of the regenerators, the node interface devices and user interface devices as shown in the systems diagram of FIG. 2. They are further discussed in the section on Driving and Terminating for Good Balance.

Figure 3:
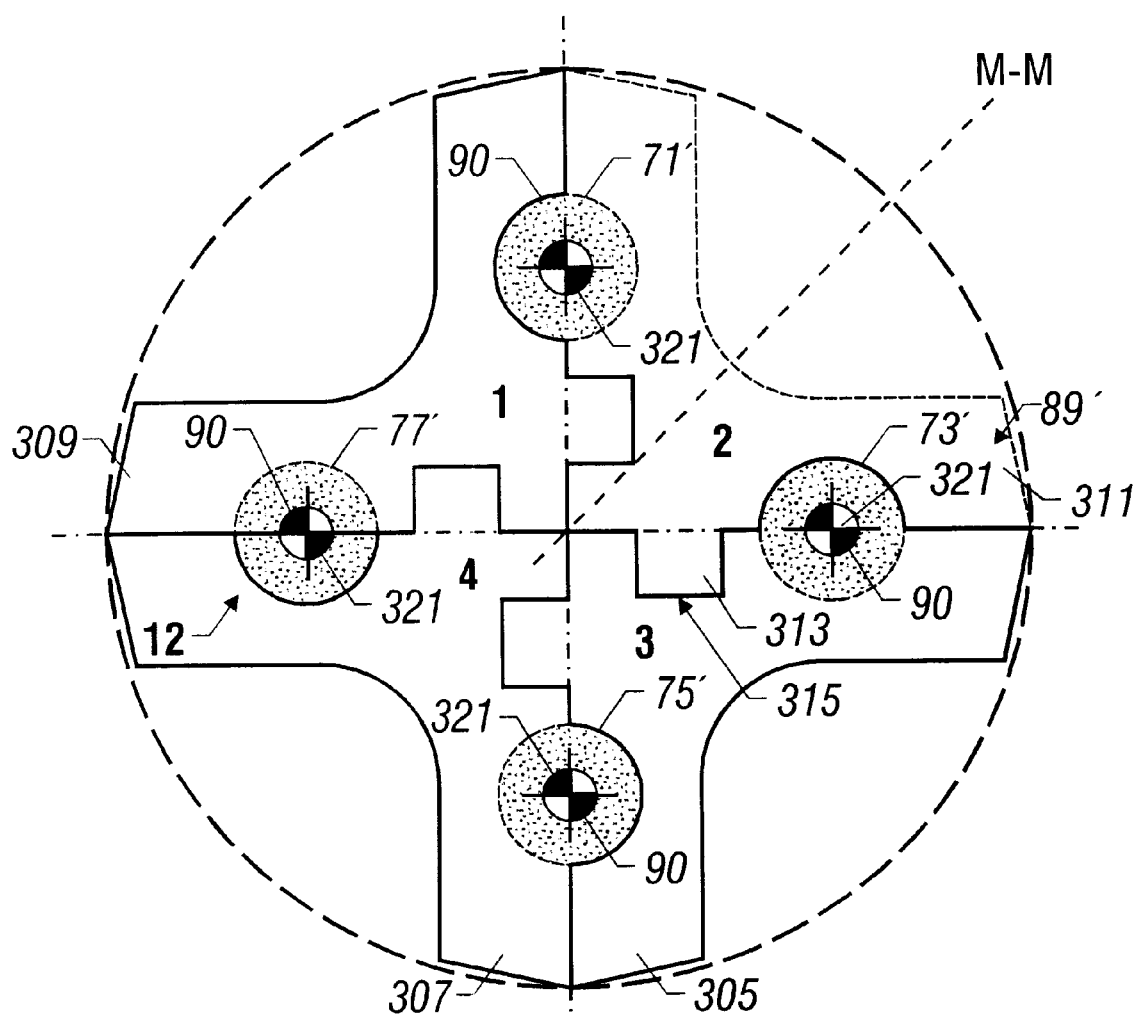
FIG. 3 is a diagrammatic cross-sectional view of one form of the novel interlocking positioner.

Another of the invention's contributions to the achievement of precision in the electromagnetic structural geometry arises from the conductor positioner structure as shown in FIG. 3. Efforts to extrude a quad with the four conductors in place has been shown to suffer significant variability even when extreme effort is exerted to control the process. Canadian Patent No. 788,603, issued Jun. 25, 1968 to Eyraud and Delorme of Compagnie General d'Electricite, Paris, France, endeavored to create good symmetry by mechanically milling four helical grooves into a continuous cylindrical "stem" including a thermoplastic dielectric (presumably extruded), reinforced centrally by a glass fiber cord, and subsequently placing conductors in the four milled grooves. This patent shows spiraling of the grooves to provide the desired helical rotation of the quad orientation. Such an assembly was then to be covered with a suitable additional insulating dielectric, shielded, and externally sheathed. The plastic "stem" material and its processing, probably by extrusion to a form suitable for machining, was not discussed.

It has been well known in the art that considerable stresses are usually present in material formed in such a manner. Machining releases these stresses resulting in significant relaxation strain. This affects the precision of the resulting machined "stem" both initially and increasingly over time by both release through aging in the field and from daily temperature cycling experienced by outdoor cable systems. The Eyraud patent's approach, apart from any limitations of its method of creating the "stem," simply precedes a different group of precision problems coming from the placement of its wired "stem" into some surrounding dielectric and shield since any errors in doing so will also translate into imbalance in the resulting system. The manner of accomplishing this last phase of fabrication was not disclosed and only suggestions, such as wrapping with a tape, were mentioned briefly by the patent.

The present invention avoids such problems by providing a precision insulating and positioning structure, as show in FIG. 3, which locks the conductor array 71, 73, 75, and 77 into a precise position within an electromagnetically enclosed final form. In one form, the positioner 89 is fabricated as four linked longitudinal sections using an especially high stability extrusion process disclosed below under Extrusion Methods. This process ensures that the as-fabricated shapes of the four parts remain identical and stable not only during manufacture but subsequently during extended use and during aging in the field. The inventive method releases stresses normally associated with the pressure and temperature gradients present in standard extrusion methods (even when using mixing as with screw plasticizing means). The lifetime performance of the present invention's cable system may be, whether indoors or outdoors, even greater than one hundred years. Selected modern materials, along with the fabrication methods of the invention, make this desirable objective economically attainable.

Figure 3A:
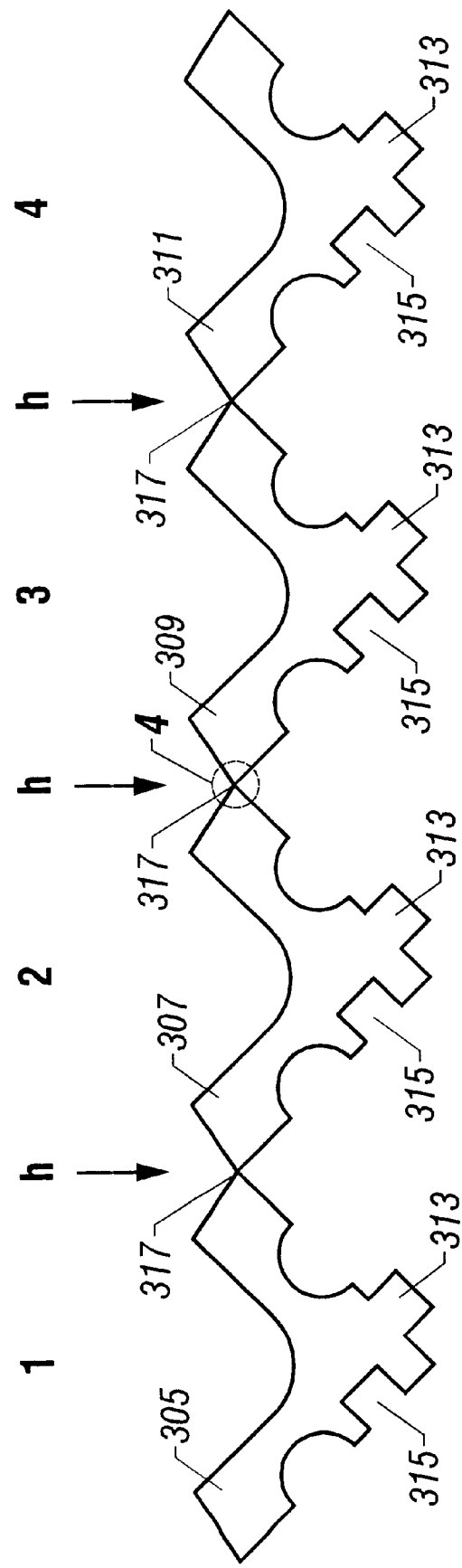
FIG. 3a is a view of the form of the unlocked extrusion of FIG. 3.

In several preferred forms, these novel insulating and positioning parts interlock around precise annular signal conductors also of a special form further disclosed below. Some examples of the general form of these four positioner parts is further illustrated in FIGS. 3, 4, 5, 6 and 8. These figures illustrate how a typical interlocking set of projections and recesses may be configured to capture and hold the relative locations of the elements of a positioner structure for the four quad conductors. Referring to FIG. 3, positioner 89 is shown in four separate sections. These sections are numbered 305, 307, 309, and 311. Each of the sections is generally L-shaped and includes a male member 313 which fits in slot 315. These elements are further shown in FIG. 3a. FIG. 3a further shows a number of hinge points 317 which allow the sections to be conveniently extruded. Once the extrusion is formed as in FIG. 3a, each section can be rotated with respect to its adjoining sections in order to form the complete positioner 89'.

Figure 4:
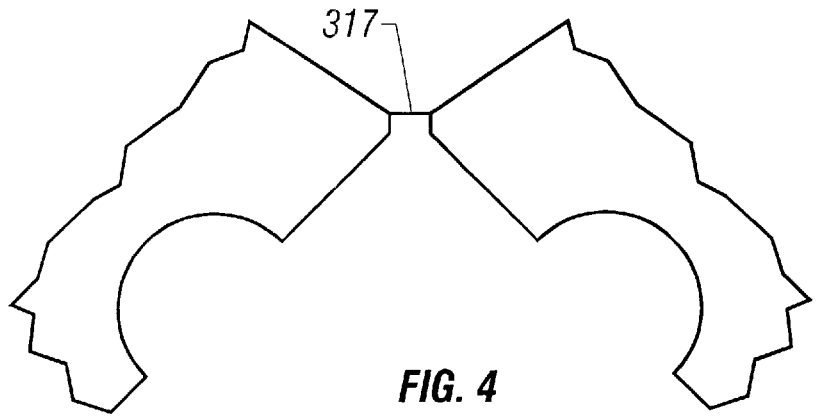
FIG. 4 is a schematic further detail of the positioner.

FIG. 4 shows a more detailed view of the molded-in hinge 317. As may be seen, in a four-section extrusion, typically three junctions or hinges 317b would be appropriate.

Figure 5:
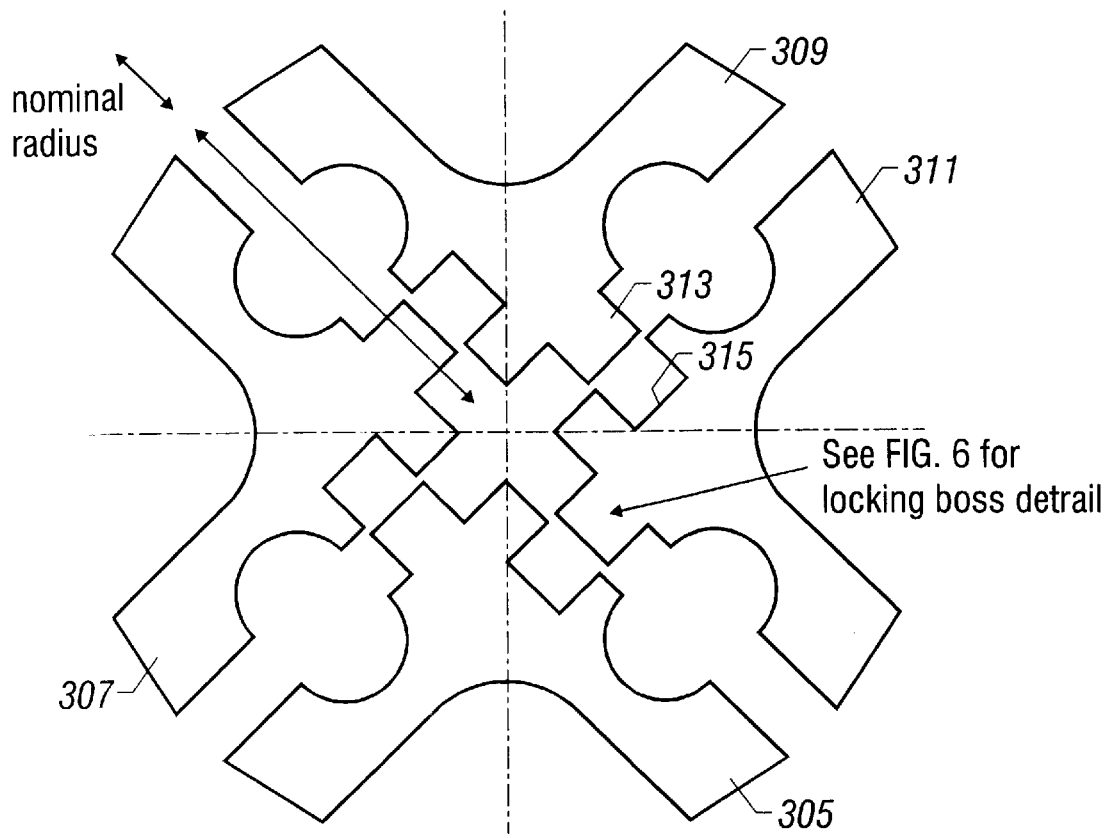
FIG. 5 is a schematic exploded view of one embodiment of the positioner, illustrating separated interlocking elements.

The sections may be rotated in order to form the complete positioner 89' or may be separated at the hinge points prior to such formation. FIG. 5 shows the embodiment where they are separated. FIG. 5 also shows the male member 313 of each positioner in a position to enter the slot 315.

Figure 6:
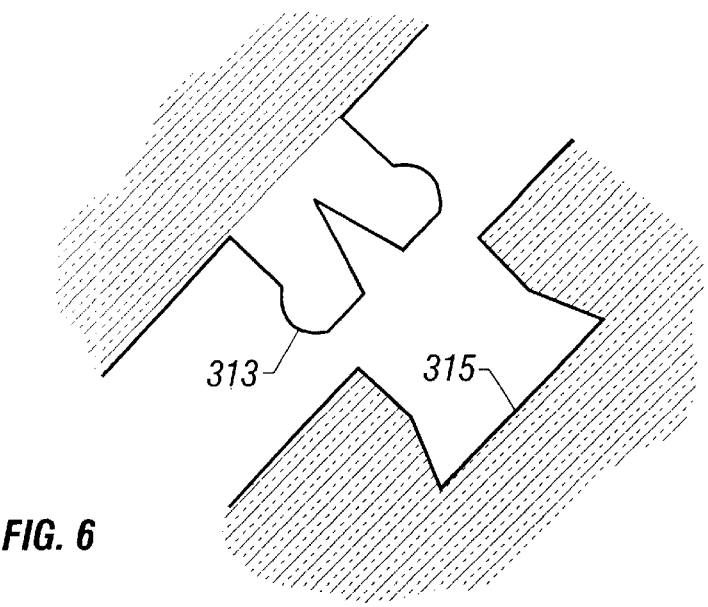
FIG. 6 is a diagrammatic enlarged cross-section of a form of snap-locking portions of a positioner which may be employed with the present invention.

This situation is shown in more detail in FIG. 6. In particular, FIG. 6 shows an example of a possible snap locking configuration. An annular ring around male member 313 fits in a corresponding section of slot 315 to more securely hold the sections of the positioner 89' together.

Figure 7:
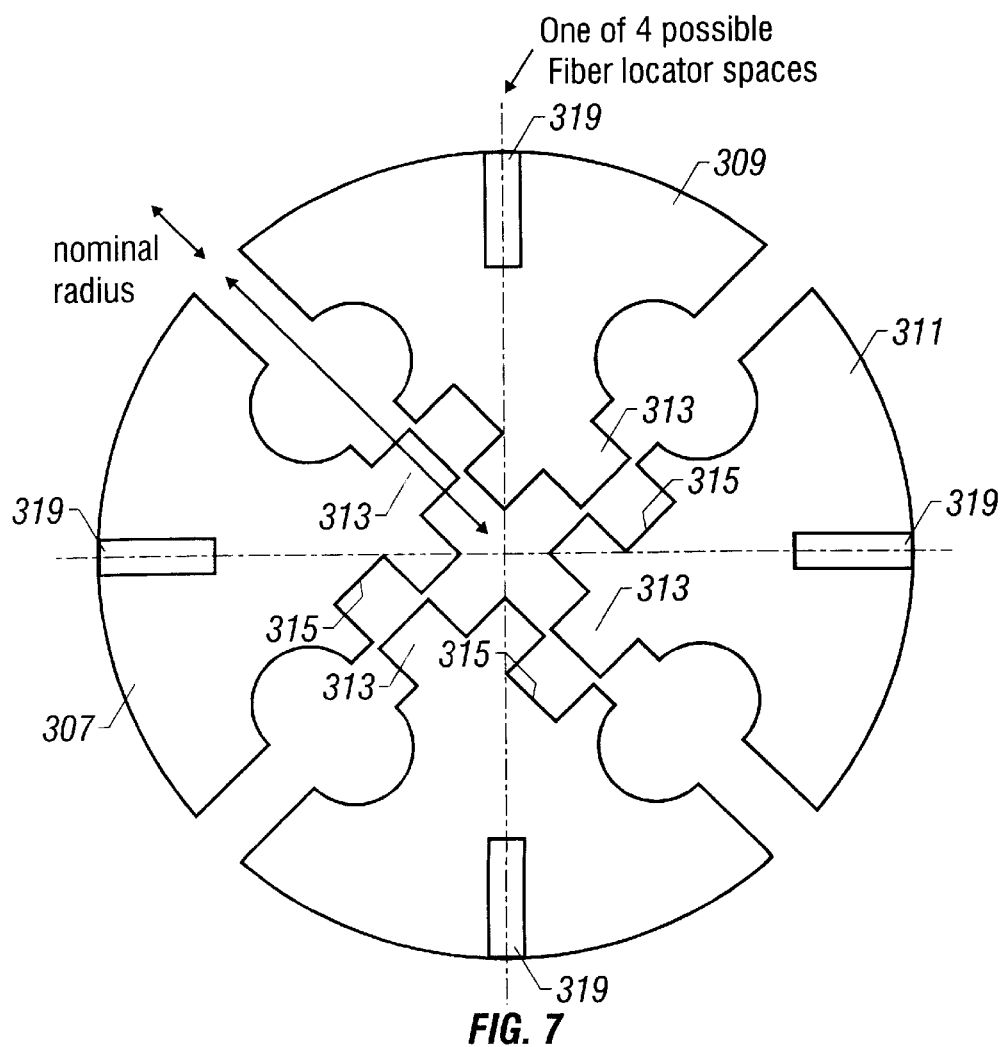
FIG. 7 is a schematic cross-section of a full circular form of the four section extruded positioner.

The perimeter may be of any convenient shape as in FIG. 7, where it is circular. FIG. 7 also shows optional perimeter slots 319 for holding fibers or other conductors. In an alternative form of this structure, the slots 319 may not be present, the perimeter being just some circularly symmetric surface. Any fibers or conductors other than the four quad conductors may, in this example of structure, be entirely within the interiors of the four quad conductors.

Returning to FIG. 1b, there is shown sufficient space to install fiber optical lines in the interstices or buffer channels 81, 83, 85, and 87 of the positioner. Further, the positioner shape 89' may be formed to accommodate whatever cable shape is desired. The positioning and the dielectric properties of these four regions must, however, preserve the quad's internal electrical symmetry. The four regions must be uniform in their electrical behavior even though that aspect may have nothing to do with their function as optical fiber holders.

The inventors have further found yet another way to include optical fiber in the new quad structure. As indicated in FIG. 3, the cores 90 of the four annular conductors 71', 73', 75', and 77' may be used to contain fibers 321 in each one or any combination without disturbing the electrical balance. For example, one to sixteen or more fibers may be provided inside each of the four annular conductors allowing electrical performance to be independent of the fiber's dielectric properties. This advantage is considerable since the desired helical twist of the quad array (a non-limiting example uses approximately two turns to the foot) will also provide significant margin for elastic relief of the fiber, freeing it from thermal expansion, movement or mechanical strain from cable movements. The helix suggested in the example requires about 110% length of conductor and fiber within the cable relative to its overall exterior cable length.

Figure 10A:
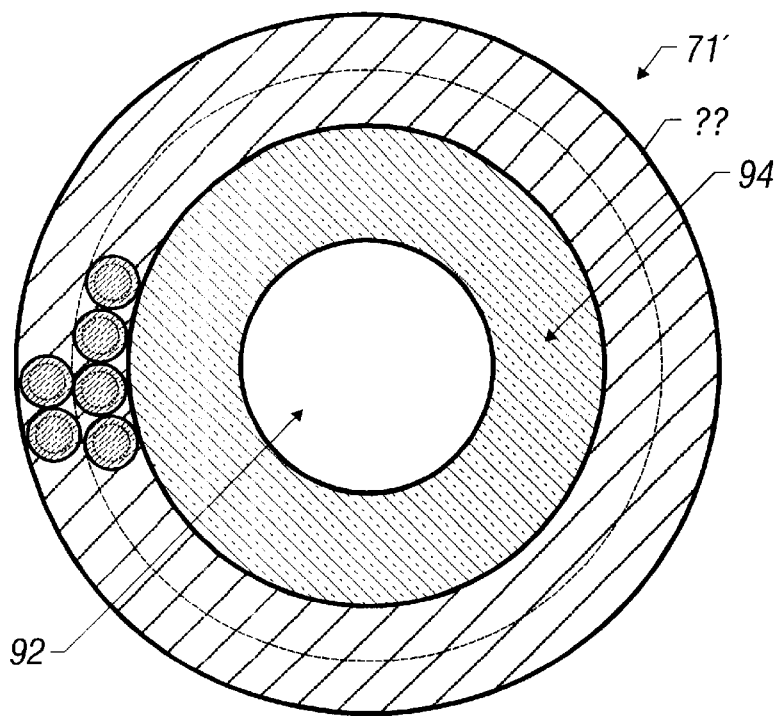
FIG. 10a shows a cross-section of a form of the novel annular conductor, showing the novel wave guiding wires and the center core available for optical fibers.

FIG. 10a shows in cross section one possible type of annular conductor of the invention, here exemplified as 71', the center region 92 of which allows fibers to be installed during manufacture or even to be blown into place later after a cable is installed. One way in which fibers may be installed after the cable is laid includes the technique of fiber blowing. In this technique, a mushroom-shaped device is attached to the end of the fiber, and the tip of the fiber is placed within a cable. A high pressure air source engages the mushroom-shaped device, pulling the fiber through the cable. Other techniques, as are known in the art, may also be employed. FIG. 10a shows a cross section of one example of such an annular conductor of the innovative design. The center annular support sheath 94 need only be of such thickness as will adequately support the woven braided special electrical conductor 110. The surface of the interior fiber conduit 94 may be of a low friction material such as one of the fluoropolymers. This allows a wide range of possible choices for accommodating the optical fibers. The structure of each of the, e.g., 36 individual wires which may be employed in this example derives from a new approach to minimizing the skin effect and the proximity losses found in braided multi wire conductor configurations. Discussion of the skin effect was introduced above in the section entitled Energy Losses and HFTL. In considering the behavior of electromagnetic waves propagating into a conductive medium, the group velocity of the actual physical energy moving into the material becomes remarkably small considering that it is an electric field effect. That velocity is but a very tiny fraction of the velocity of light propagating in free space. For example, for the conditions describing the skin effect data for copper given above, this group velocity is 47 meters/sec at 1 MHz and rises to only 470 meters/sec. at 100 MHZ. The space and shape of the annular conductor may be selected to suit the requirements of the fibers without compromising the qualities of the annular conductor. Over time, optical fibers may be susceptible to damage by corrosion from water vapor. Superabsorbent compounds may be used to fill the space about the plastic coated optical fibers within the center region 92 carrying them. These materials absorb and immobilize what little water enters the otherwise well enclosed relatively water resistant cable structure. The outer sheath 94 of such a cable must also be relatively impermeable to water.

Figure 10B:
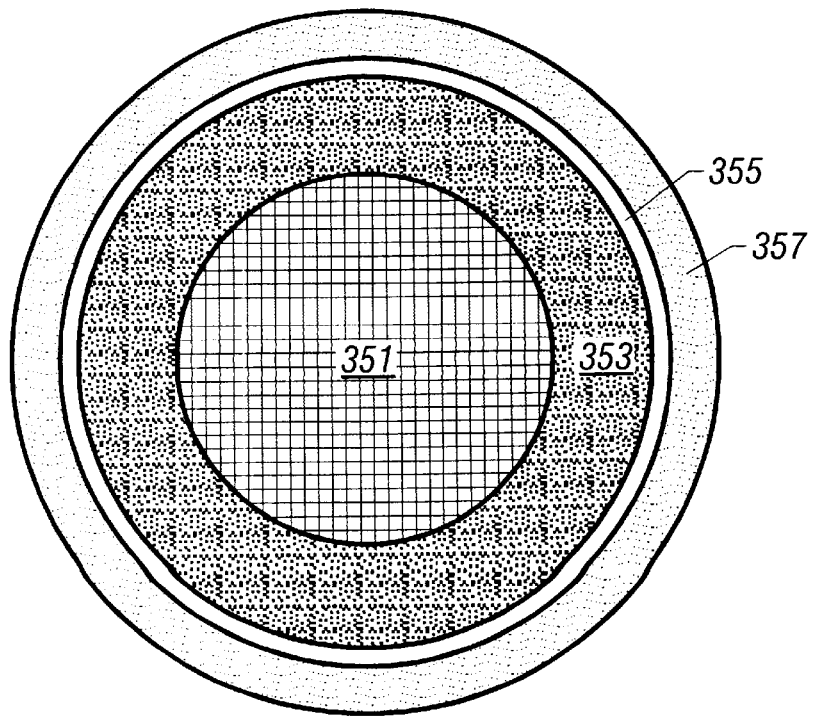

FIG. 10b shows an annular conductor utilizing an embodiment of the invention's structure for improving the performance of the 36 strands (shown as ends in the figure) of #39 size magnetic material wire, 50% conduction coated with copper as described below in relation to FIG. 11. Each wire of the 36 strands, as shown in FIG. 10b, has a first conductive layer of copper material 353 coating a steel tensile core 351. This is followed next with a high frequency magnetic material matrix 355 having a high degree of permittivity anisotropy as described below and further coated with a fluoropolymer insulation 357. To form the annular conductor, these wires are woven in a 2×18 weave braid filling the surrounding portion of the 0.042 inch OD hollow sheath which is suitable for containing optical fibers or other conductors. The braid is a tight weave to closely hold the design outer diameter to the value needed to maintain the nominal design impedance value.

Figure 10C:
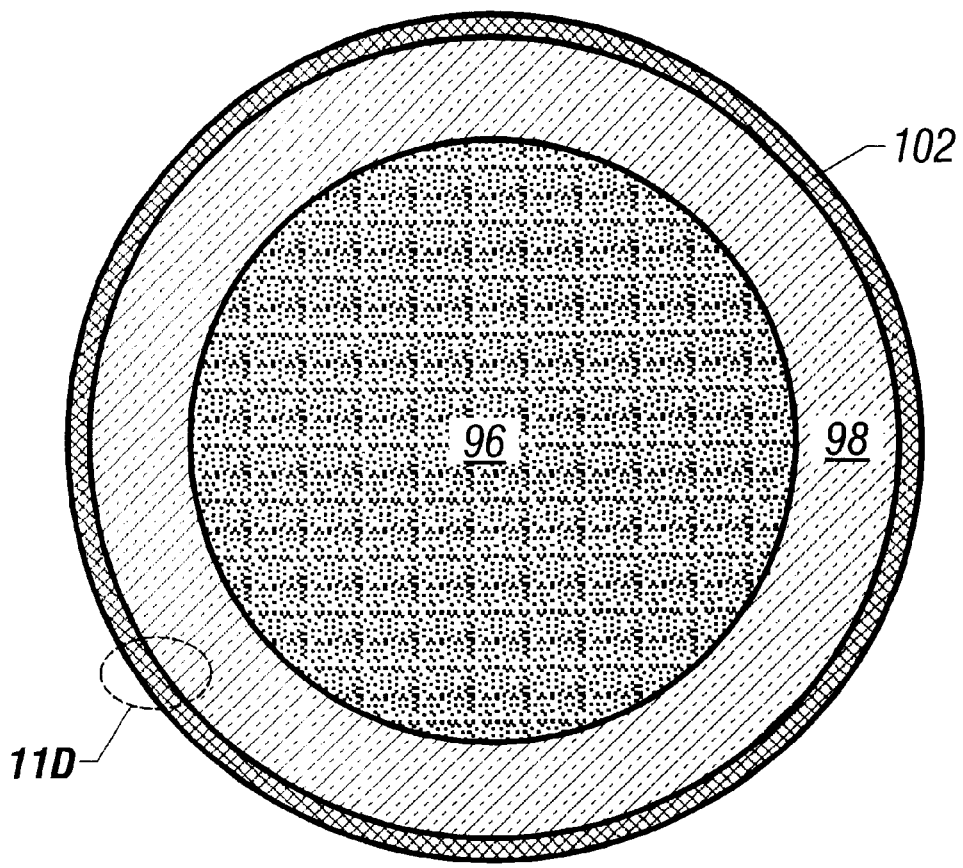
FIG. 10c shows a form of a unitary tubular annular conductor ("UTAc") having a surface wave guiding function and with a center core available for containing optical fibers and protectant.
Figure 10D:
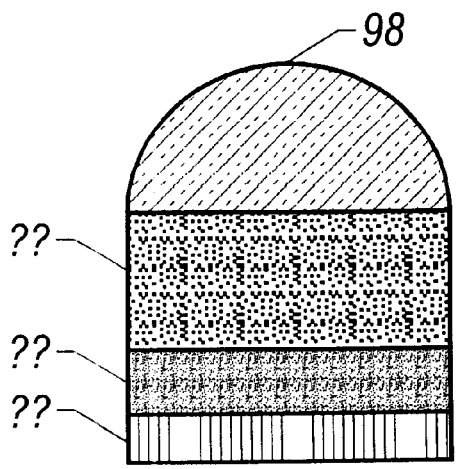
FIG. 10d shows a schematic cross-section of the unitary tubular annular conductor of FIG. 10c.

Yet another form of annular conductor, shown in FIG. 10c, is inherently water vapor proof by virtue of a solid metallic tube 102 giving even better protection for its enclosed optical fibers. In FIG. 11c, a center region 96 for fibers is shown. The wall surrounding this region should be thick enough to support flexing and the magnetic field strengths encountered. Surrounding this region is layer 98, formed of a tubular magnetic material, this layer providing an annular support sheath for optical fibers. Finally, a coating 102 is placed on layer 98. Coating 102 may have three layers as shown in FIG. 10d. The first coating 104 is formed of a conductive layer. In this example, first coating 104 may be copper about 28 microns thick. A second layer 106 is provided of a magnetic matrix, having anisotropic $\mu$ and $\epsilon$. In this example, second layer 106 is about 10–20 microns thick. A third layer 108 may be formed of a dielectric coating, in this example being 4–8 microns thick. A schematic description of these layers is shown in FIG. 11d.

Annular Conductors

The annular conductors of this disclosure have elements and structure complementing the several functions that these four conductors perform in the invention. The annular conductors may be chosen according to specific criteria. Appropriate annular conductors may perform at least some of these six functions:

1. Carry the two signal paths with acceptable high frequency dispersion.
2. Carry power to in-line regenerators, to UID peripherals and to related devices, and optionally to permit the flow of POTS signals.
3. Maintain precision and balance in the wideband characteristic propagation impedance of each pair.
4. Keep signal losses to a manageable level, particularly at high frequencies.
5. Act as a protective conduit for the optical fibers needed for present and future applications.
6. Provide additional strength and stability for the quad assembly to help preserve the geometry for low XTLK and high EMIR.

Figure 11:
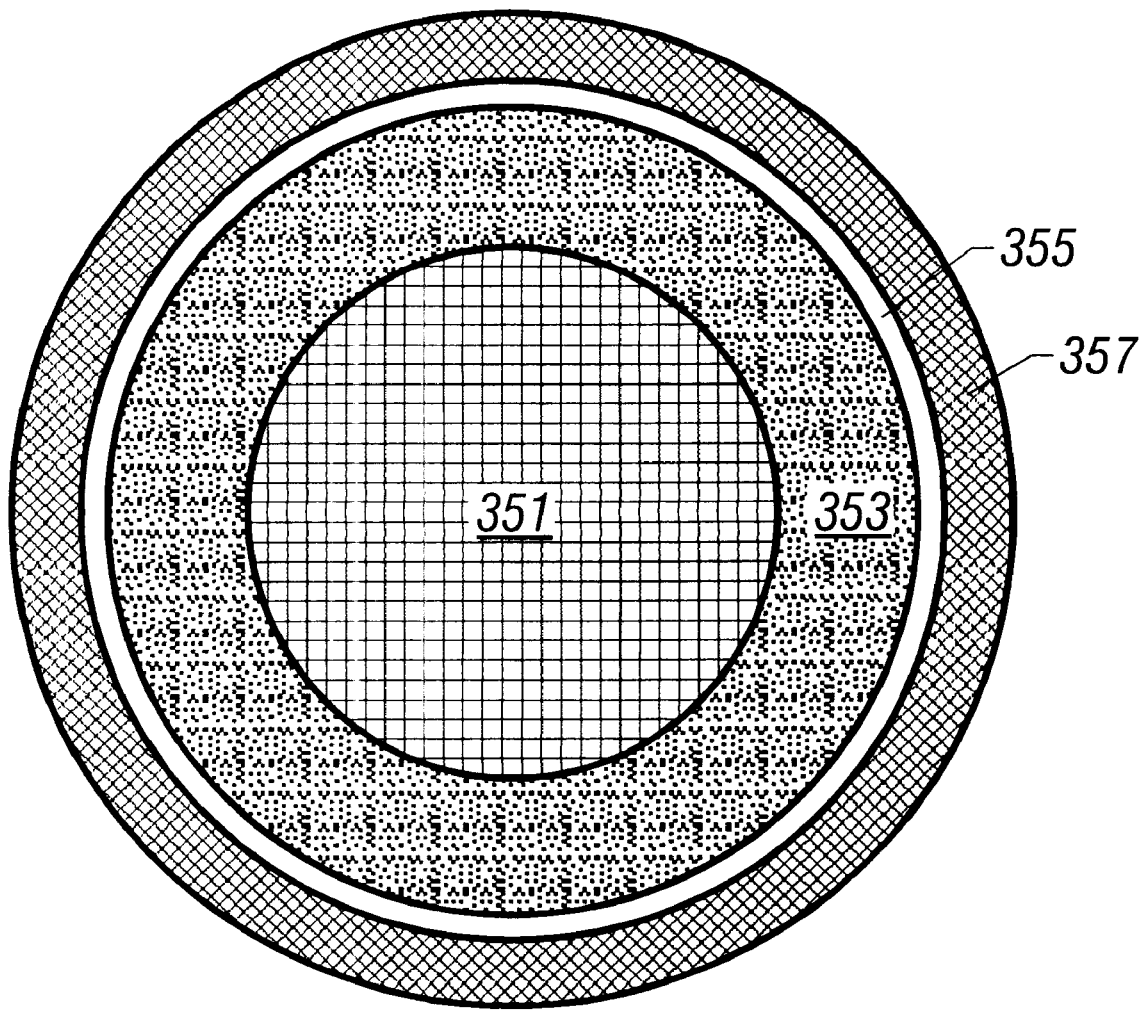

FIG. 11 shows a cross-section of such a kind of individual wire as discussed above with respect to FIG. 10b. Its design differs from the prior art in a number of significant ways that may utilize the less well-known properties of wave propagation effects in and on conductive media. These aspects of the invention have the object of improving performance of the signal carrying elements and aiding in the rejection of unwanted external electromagnetic energy by altering both:

a) the skin effect properties of the individual conductors; and
b) substantially modifying the proximity effect interactions of one conductor on an adjacent conductor.

A modification of the propagation of the electromagnetic signal energy into the conductor structure is accomplished in an asymmetric fashion which encourages propagation along the conductor length and improves penetration into the conductive elements.

These conductors have at least some of the following main features:

1. They employ a ferromagnetic material core wire 351 of fairly high strength which has been selected from among materials that also have significant magnetic remanence when axially magnetized.

2. A high conductivity metallic coating 353 which is applied to the surface of such a wire core. In the illustrated case of FIG. 11, the DC resistance selected for the copper coated finished wire is 50% of the conductance of an equal (coated) diameter made entirely of copper. With copper used as the conductive material, just a thin layer of copper on the ferromagnetic material is required.

3. This conductor layer is further covered with a thin coating of a high frequency magnetic material 355, having moderate permeability which also displays the following other properties. This coating material 355 is selected from among materials and methods of forming so that when in place on the clad wire, both its permeability ($\mu_r$) and permittivity ($\epsilon_r$) are substantially alterable by the strength and by the direction of a practical value of a biasing magnetic field. When the wire is magnetized, a spatial anisotropy results in values of both $\mu_r$ and $\mu_r$. For a given application and for the frequency range of interest, the magnetic material is further selected to have it has a desired appropriate variation of permeability with frequency over that range and a desired limited amount of energy dissipative losses.

4. The magnetic coating 355 may be a mixture of very fine particulate material (e.g., even nano-phase) with a matrix binder which is selected to allow the permittivity and permeability to be substantially permanently oriented and aligned by a magnetic field during manufacture of the composite wire such that there is thereby produced a substantial and desired spatial anisotropy in both these parameters ($\epsilon$ and 82). This provides magnetic permeability in the circumferential region about the conductor that is substantially different from the axial direction and, likewise, a related anisotropy in the circumferential and axial permittivities. This may be accomplished by having the mixture of magnetic materials and a binder in a quasi-fluid or semisolid form which is solidified during the manufacturing process while still under the influence of an applied magnetic field of adequate proportions.

The magnetic material may be one of the class of high frequency ferrites such as one of the Philips Ferroxcube type 4 nickel zinc materials, crushed after being fired and then finely milled, to a particle size giving 98% by weight and being less than 5 microns.

It has further been found desirable that the biasing magnetic field be applied so that the field polarity is reversed in a manner that will cause the anisotropy to be present continuously down the length of the wire, but with the remanent magnetization of the ferromagnetic material wire core and the related polarization of the magnetic molecules being reversed spatially periodically down the length of the wire. The spatial periodicity is chosen in relation to the demagnetizing effects in the ferromagnetic material wire core and also in relation to the wavelength of the highest frequency spectrum to be transmitted in the cable system and the propagation properties desired for that spectrum.

The structure and functioning of this anisotropic system differs fundamentally from prior systems. Numerous examples exist in which magnetic materials have been used to simply "load" the signal conductive lines as in past efforts to increase inductance of the line, thereby raising its propagation impedance, and thereby to reduce signal loss and to correct frequency response drop off. A few U.S. Patent examples of this are: U.S. Pat. No. 1,586,887 to Elmen, "Inductively Loading Signaling Conductors"; U.S. Pat. No. 1,672,979 to Fondiller "Loaded Conductor"; U.S. Pat. No. 2,669,603 to Prache "Transmission Line With Magnetic Loading"; U.S. Pat. No. 2,787,656 to Raisbeck; U.S. Pat. No. 4,079,192 to Josse "Conductor For Reducing Leakage At High Frequencies" and in a different class of effects are: U.S. Pat. No. 3,668,574 to Barlow "Hybrid Mode Electric Transmission Line Using Accentuated Asymmetrical Dual Surface Waves"; U.S. Pat. No. 4,017,344 to Lorber et al, "Magnetically Enhanced Coaxial Cable With Improved Time Delay Characteristics"; U.S. Pat. No. 5,574,260 to Broomall et al. "Composite Conductor Having Improved High Frequency Signal Transmission Characteristics". Elmen and Prache are examples of inductive loading equivalent to lumped inductor effects in the line. Prache was one of the first to develop the analysis of the magnetic material's dielectric effects on the impedance of the loaded cable. Raisbeck '656, issued Apr. 2, 1957, completed such analysis by incorporating all losses including the dielectric losses neglected by Prache. Raisbeck's analysis was further expounded in his Bell System Technical Journal article in the March 1958 issue (pp 361–374). The emphasis of such workers was to minimize the transmission losses for a given size (mainly in coaxial types of lines). They did not attempt to directly alter effects such as skin or proximity.

Fondiller '979, issued Jun. 12, 1928, describes coating a wire with a magnetic material in an extrusion method which he also magnetizes by sending a "strong DC current" down the wire. The coating material described was iron powder in a binder. The patent explains that the DC current magnetizing was performed to raise the coating's permeability and thereby increase the inductance per unit length following the established approach of lowering losses by raising a transmission line's impedance level. No asymmetry properties or other magnetic or dielectric effects were disclosed.

Josse discloses coating the wire with a magnetic material mainly to reduce losses from eddy currents in adjacent wires, applying this principle to Litz wire applications. He also applies the process to superconductive cables and to very high current power line frequency applications, the focus there seemingly being eddy current effects.

The latter group of three patents (Barlow, Lorber et al., and Broomall et al.) are different. All describe experimental results that are not readily explained by classical transmission line and conductor theory. They all cite experimental data showing non-classical behavior. Only Barlow develops a theory of surface wave properties affecting the wave propagation. Lorber observes an anomalously low time delay in his structure but proposes a rise in the effective inductance, in series with the cabless' shunt capacitance, to explain it. In other portions of his disclosure, a "wave guide" effect is suggested as contributing to the observed behavior. Lorber also cites the Kehler & Coren 1970 paper (See Kehler, et al., Susceptibility & Ripple Studies in Cylindrical Films, J. of Appl. Phy., vol. 41, no. 3, (Mar. 1, 1970) pp. 1346, 1347) which shows evidence of a non-classical propagation effect at 110 MHZ in a short section of a thin magnetically coated wire employed as a center conductor in a coaxial structure.

Broomall et al. develop their explanations of anomalous propagation effects purely in terms of the skin effect behavior. Their structures differ from Lorber in that a magnetic substrate is employed for their basic structure, although they also give suggestions of three layer structures which place the magnetic material in the middle layer. The example they give shows only moderate improvement in loss and delay behavior and no suggestion is made of there being a propagation dominated process. It is not clear from their teaching how to optimize their method for other materials and dimensions.

Barlow thus remains the only one of these examples to propose a direct effect on the wave propagation process. As earlier discussed, the skin effect may more effectively be treated as a propagation effect within the highly conductive and/or permeable media of the sorts of means employed by these patents. Barlow acknowledges the lack of an analytic mathematical treatment in his description. He relates a family of experiments which he finds to be demonstrations of a novel mode of propagation which he calls non-TEM modes. He employs a dielectric layer to develop the novel modes and gives a wide range of thicknesses to be deployed covering the frequency range of 1 MHZ to 10 GHz. His journal papers and the curve given in the patent show a substantial alteration in attenuation as a function of the added thin dielectric layer.

It is likely that all three of these patents are best understood in terms of energy-trapping behavior altering the energy propagation.

None of this cited prior art addresses the propagation effects that the invention addresses nor do they teach the development and influence of joint anisotropies in permittivity and permeability. The ferrite type materials discussed above are but one example of possible materials that have microstructural properties such that, under the influence of a magnetic field of moderate value (less than one Tesla), their electromagnetic properties (dielectric and magnetic) are substantially altered with respect to the intensity and direction of the magnetic field. Other crystalline, semicrystalline or even somewhat amorphous substances may display internal ordering properties that develop comparable anisotropies. The invention in part uses such effects to achieve the enhancement of the propagation properties resulting from the unusual spatial distribution of these properties.

5. The composite wire may be further coated with an insulating outer layer 357. The insulated construction then completes the separation of the component composite wires into a woven or spirally wrapped annular conductor configured on a support core as shown in FIG. 10*a*.

An Alternative Embodiment of the Annular Conductor

FIG. 10*c* illustrates yet another non-limiting embodiment of an annular conductor that may be used for the quad cable. Referring first to FIG. 10*d*, this hollow core annular conductor may be formed as a single tube of magnetic material 98, coated with a conductive (metallic) layer 104, followed by a thin magnetic matrix layer 106, and overcoated with a very thin insulating layer 108. This structure resembles the layer structure of the individual wires described above. For many applications, this unitary tubular magnetic core form is advantageous. For example, it allows each of the four annular conductors to enclose optical fibers in a vapor proof barrier tube without requiring that the entire cable be thoroughly vapor proofed. Such a tube also affords the opportunity to increase the diameter of the central void space available for the optical fibers and superabsorbent protective filling. The remanence in the magnetizable tube, the scaling of the conductive layer, and the anisotropic properties of the matrix layer may be adjusted to provide effective low loss and uniform propagation behavior resulting in substantially the same or potentially better performance than the woven wire form described above. This simplifies the cable construction and reduces costs, yielding a lighter and somewhat smaller cable. This cable example's tensile strength member would likely be a corrosion resistant high strength braid incorporated into the cable just below the outerjacket covering. The outer covering layers should employ the EMI symmetrizer and the outer impedance-matching housing layer having the resistive spatial impedance design, both as described above.

These annular conductors have at least the following unique and novel properties, and they differ in many fundamental ways from the prior art known to the inventors.

Magnetically "loaded" structures and systems of the prior art have generally focused on simply raising the impedance level of a transmission line propagating electromagnetic energy in relation to the lossey behavior of the conductor systems used to launch and convey the energy. In this strategy, the magnitude of the resistance of such conductor losses becomes a smaller part of the impedance of the transmission system, thus reducing the portion of energy lost to that cause. These efforts do not materially affect propagation properties, nor do they reduce the skin effect resistance which dominates the conductor AC resistance—especially at high frequency. These approaches have a disadvantage in that they reduce available bandwidth as the price paid for such reduction of losses. A few exceptions have dealt with eddy currents and proximity effects as discussed above. Most of that art has been in power transmission applications with narrowband or fixed frequency strategies that are not applicable to, nor suitable for, the transmission of wideband signal energy. (see U.S. Pat. Nos. 3,160,702, Lapsley; and 3,594,492, Bader.)

The present invention, on the other hand, modifies the skin effect in the conductor and alters the manner of propagation of energy along the transmission line path. Such an approach need not raise the impedance of the structure to accomplish improvement and bandwidth is not compromised.

Prudent choice of the configuration of conductors requires that other objectives be served along with keeping transmission energy losses appropriate for the needs of any given application. Such balancing of choices is exemplified by the advanced quad structure's system objectives that heavily weight signal-to-noise ratio, thus emphasizing high performance in XTLK and EMIR behavior. These features together enable the network performance necessary to fulfill the last mile cable system needs.

Soliton Propagation

Under some conditions, the propagation within the subject cable displays very low energy dispersion properties of a type related to the soliton propagation properties that were first noticed in the mid-nineteenth century (1834 by J. S. Russell) as a remarkable kind of far traveling water wave created by a towed barge on a canal in Scotland. Others, after Russell, explored the phenomena mathematically with Korteweg & deVries developing an important basic describing equation (1895). Fermi and others explored the mathematics of such wave systems in 1955 but the major next step came when Zabusky & Kruskal carried the analysis deeper, coining the term "Soliton" to describe the coherent group-like properties of these wave phenomena. Most of the mathematical and practical work on the subject has come about in the 30+ years since then. Soliton propagation has been applied to fiber optic systems with desirable improvements obtained in their optical modality. Fiber optics in use today employ soliton techniques.

The novel anisotropic nature of the electromagnetic propagating conditions according to the invention allows the use of spatial propagation non-linearities (i.e., relatively abrupt and also spatially periodically varying ii and e) for launching and receiving energy in soliton like mode, having very low dispersion and hence very good high speed waveform fidelity. Soliton propagation presents advantages of lower energy loss, longer runs, and larger effective signal bandwidth because of the character of the soliton's group velocity to carry signal energy over a considerable distance while preserving both its energy and its form in space and time.

The signal source and load coupling means for accomplishing this may be somewhat more complex and costly but can likely be justified when needed. The inventors have not found any prior art that employed such methods for soliton propagation of electromagnetic waves in the sub-optical wavelength range for substantially an all electrical energy transmission mode. The three patents cited above (Barlow, Lorber, and Broomall) all suggest non-classical propagation but do not explain nor teach a method to achieve an optimum such as this. This embodiment of the invention, contemplating such anisotropy arrangements as described, will facilitate low loss modes of signal transmission in addition to displaying low dispersion of the higher speed elements of digital signals. Other anisotropic wave propagation effects, described in the foregoing section on the special annular conductor structure, may be varied by the choice of magnetic field, observing the optimum for any given signals.

Positioner Fabrication Examples

It is desirable for the precision in symmetry needed for quad cable that the positioner maintain substantially invariant electromagnetic functionality, despite changes induced by expected (or typical) variations of its ambient conditions. Typical thermoplastic extruded shapes contain significant internal stresses which result in shape and dimensional changes that occur after forming, and especially during aging when used for outdoor service. To substantially overcome such problems, the inventors have developed techniques to reduce the production of such stresses during the forming process.

Vibration of the thermoplastic melt, the mold walls, and the extruder can be employed to improve flow rate and to improve the quality of the finished product. Vibrational frequencies ranging between 0.7 and 20,000 Hz, have been used in the prior art to accomplish a variety of goals in the production of a variety of thermoplastic products.

The inventors introduce a novel technique in processing thermoplastic materials. The inventors have found that abrupt pressure reduction and return to pressure, repeated frequently during the extrusion process, results in a substantially smoother flow and substantially lower internal stresses in the resulting extrudate form. This high-low-high pressure cycling shown in FIGS. 8b and 9b, is rapid enough to be adiabatic.

The cycling is, in effect, a kind of anti-forging process by which the induced expansion waves encourage the snagged and interlocked chains of polymers to release and unsnag. One key feature of the invention is the relaxation of pressure, during the final forming, to substantially atmospheric pressure, and the maintenance of such low pressure during cooling from just above the glass transition temperature to the essentially solidified state. Because of small material and process variability on a moment by moment basis all segments of the positioner may be formed in a simultaneous process using a common flow of molding material.

For thermoplastic materials whose glass transition temperatures are low enough to provide sufficient plasticity at melt temperatures below 600° F. a procedure such as that shown in Example A, below, is preferred. For other thermoplastic materials, like polytetrafluoroethylene (PFTE), which does not actually fully melt but rather requires a sintering process, the embodiment of Example B may be more appropriate. These examples as noted are described below and illustrated in FIG. 8 and FIG. 9.

Example A

An important factor in this process is the rapid and frequent pulsating release of pressure during the melt forming and extruding process. These thermoplastic polymers have a molecular form of both varied molecular weight and varied polymer chain length which encourages the interlocking of the chains which leads to non-Newtonian flow properties producing the locked-in stresses from typical continuous high pressure forming methods.

Figure 8A:
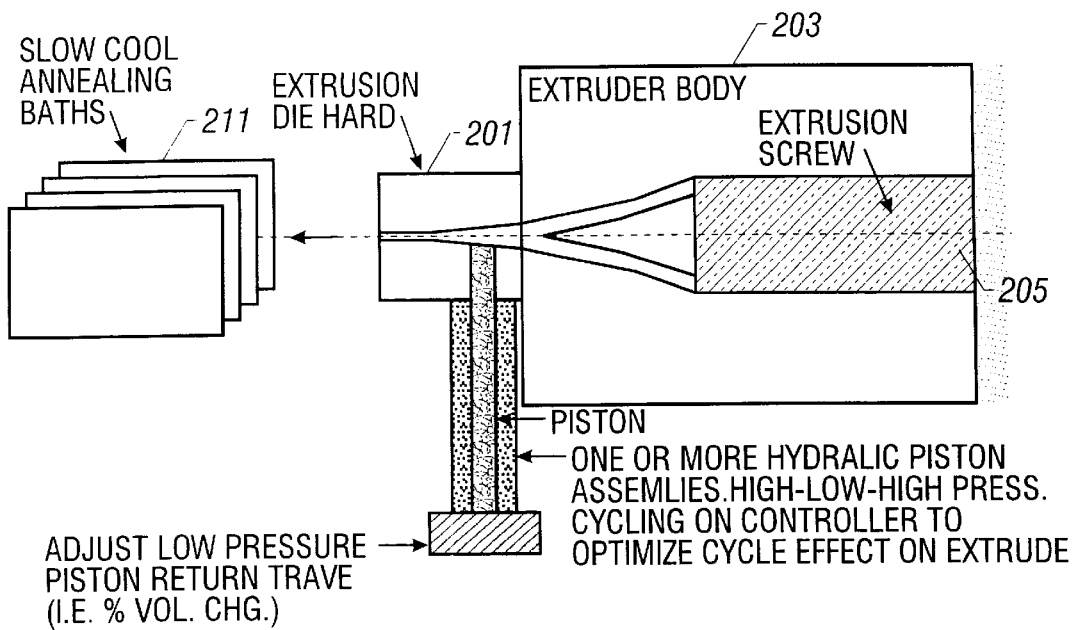
FIG. 8a is a schematic cross-sectional view of an extruder die head and body which may be used to form a positioner according to an embodiment of the present invention.
Figure 8B:
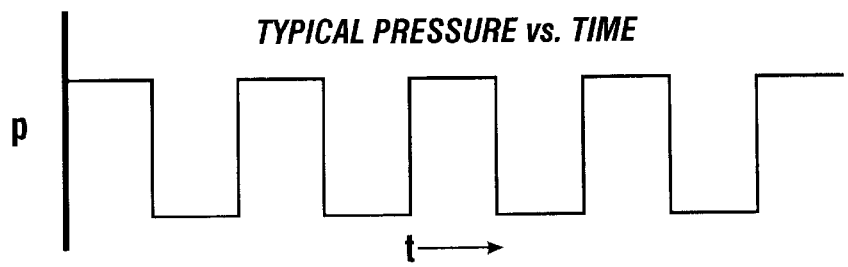
FIG. 8b shows a pressure versus time profile which may be followed in the extruder of FIG. 8a to form the positioner.

FIG. 8a shows an extrusion die head 201 connected to an extruder body 203. An extrusion screw 205 is located within extruder body 203. One or more hydraulic piston assemblies 207 are used, with pistons 209, to adjust the volume change and thus the pressure. The amount of volume change required for the pressure to drop substantially may be small. Thus, the small hydraulic pistons, surrounding the final mix chamber just before the extrusion shape die, need move only a very short stroke, which is sufficient to allow the rapid pressure change to be produced with much less inertia than might occur from efforts to move the screw plasticizer or main pressure piston. The inventors have found that the extrusion die should have a small taper along the bore in order to avoid turbulent mixing in the approach to the final form aperture.

For this process, appropriate pressures may range from about 0 psi to about 2000 psi, and this pressure may cycle about every 1 to 10 milliseconds. The cycling pressure may act on the hot extrudate while it cools to, e.g., the glass transition temperature of from −50° C. to +50° C.

Figure 8C:
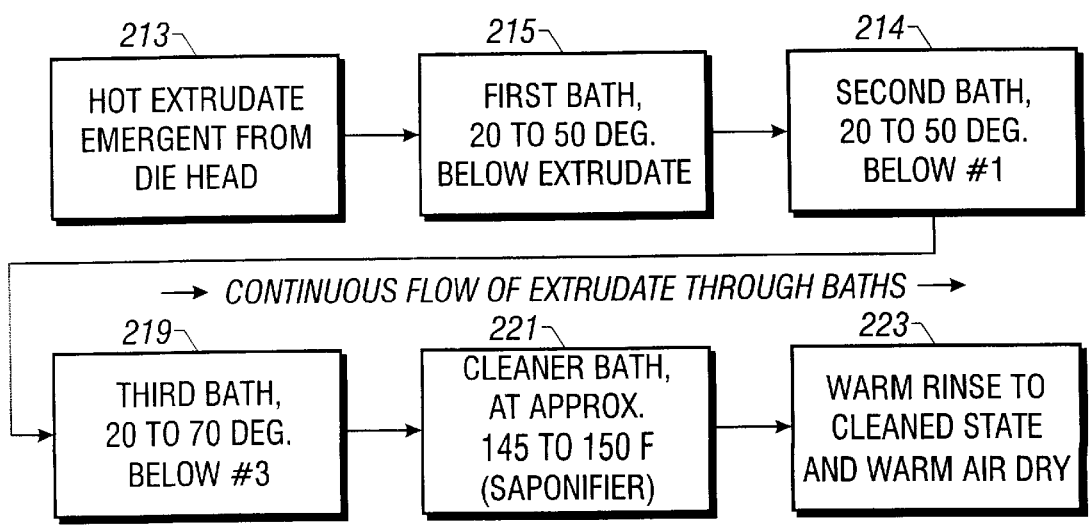
FIG. 8c shows a schematic arrangement of extrudate treatment baths which may be used immediately following the extrusion step.

The pulsating extrusion stage is followed by a controlled slow cool annealing in baths 211 whose purpose is to prevent significant cooling gradients from developing in the extrudate which would induce stresses. Such a cooling annealing flow diagram is shown in FIG. 8c. FIG. 8c indicates a schematic arrangement of extrudate (at about 100° C.–300° C.) treatment baths immediately following extrusion. In step 213, the hot extrudate emerges from the die head. In step 215, the hot extrudate is exposed to the first bath which is held at a temperature of about 20–50° below the extrudate temperature. In the next step, step 217, the hot extrudate, somewhat cooled, is exposed to the second bath, which is held at a temperature of about 20–50° below that of step 215. In the next step, 219, the extrudate is exposed to the third bath, which is held at a temperature of between 20–70° below that of step 217. Finally, in step 221, the extrudate is exposed to a cleaner bath, held at approximately 145–150° F. Following the cleaner bath, a warm rinse (step 223) is provided to clean the extrudate, which is then warm air-dried. The duration of each step is set to provide temperature equilibrium through the extrudate prior to entering the next stage of the anneal. The time for each step will vary with the cross-sectional shape and size of the extrudate.

In examining the production results of this method of pulsating release of pressure, extruded lengths of fully cooled and aged samples have been immersed in a uniformly heated bath to determine if any deformations could be observed. When extruded materials, produced with and without the process outlined in Example A, are compared, the difference becomes quite apparent in the substantial deformation of the parts not processed by such techniques. The processed parts show little or no shape or dimensional changes. The improvements observed are believed to result from the interlocked and stressed molecular chains which uncoil and relax during the brief low pressure portions of the pulse. The final forming phase of the extrusion may be performed during a low pressure condition under which the flow properties are substantially enhanced. The solidification phase should be at as low a pressure as will provide contact with the die form, typically near 1 bar.

The pulsed relief process enhances the fluidity of the extrudate. The taper used depends on the shape and the size of the cross section being produced. Tapers from 2 to 15 degrees may include the optimum range for most relatively small shapes and for materials like polyethylene, polypropylene, high molecular weight polyethylene, and some copolymer mixes. One important parameter that the taper controls is the proportion of sectional volume reduction which produces a pressure increase to expel the extrusion along with an adiabatic temperature rise. The amount of taper needed will vary with the melt properties (viscosity and non-Newtonian behavior). The choice of angle can be directly related to the sectional volume and, in the ideal case, will vary with the sectional thickness in complex shapes. For many melt behaviors, the effective volume reduction may be in the range of about 1 to 7 percent.

The initial exit of the extrudate has a very short air cool section before entering the first anneal bath. Choice of the temperature of this first bath is selected by experiment to just stabilize the particular material with minimal stress with respect to properties such as its shape, section thickness and the volumetric exit velocity. This can be anywhere from 20° F. to 100° F. below the extrudate exit temperature, taking into account that there is always some adiabatic cooling from the pressure drop upon exiting the die form. Three stages of successive bath temperature drops may be sufficient to stress-relieve and stabilize most forms. The length of extrudate that engages each bath, and thus the time it spends therein, are determined by the stability of the temperature of the extrudate as it emerges from the bath. After the final anneal bath, a cleaner bath removes any residues of the anneal bath materials. For the higher temperature thermoplastic materials, the initial bath (or baths) may be one of the low acid purified mineral oils suited to the operating temperatures. The cleaner bath removes such residues and any other significant surface contaminants.

Example B

The fluoropolymers, which are highly desirable for their low dielectric constant and very low loss properties in the 10 MHZ to 1 GHz range, have rather more difficult forming properties. These materials do not really melt like the thermoplastics discussed in Example A. The fluoropolymer material, which starts in particulate form, is processed in a manner that is somewhat akin to powder metallurgy. It is pressed into a shape, possibly with a binder, as a "green" form and is then sintered into a final solid form and shape. During the pressure forming of such green shapes, similar pulsed pressure releases have a beneficial effect on the uniformity and results from the post-forming sintering process. FIGS. 10a, b and c describe a method applied to such materials and shapes. After fully sintering and curing PTFE, for example, post-forming of the heated material in an inert atmosphere and in a pressure-pulsed forming die producing rapid high-low-high volume alterations of 1 to 3 percent, enhances the stability and accuracy of the final form. This sequence of pressure varying process steps constitutes Example B for such materials.

Figure 9A:
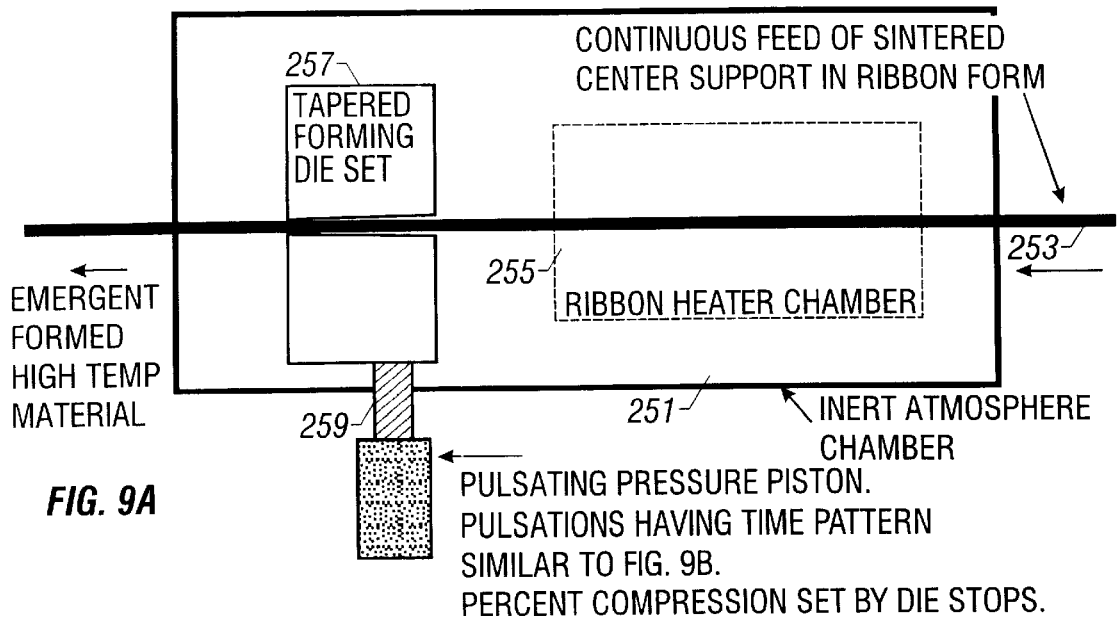
FIG. 9a shows a schematic diagram of an alternative die which may be used to form the positioner of the present invention.
Figure 9B:
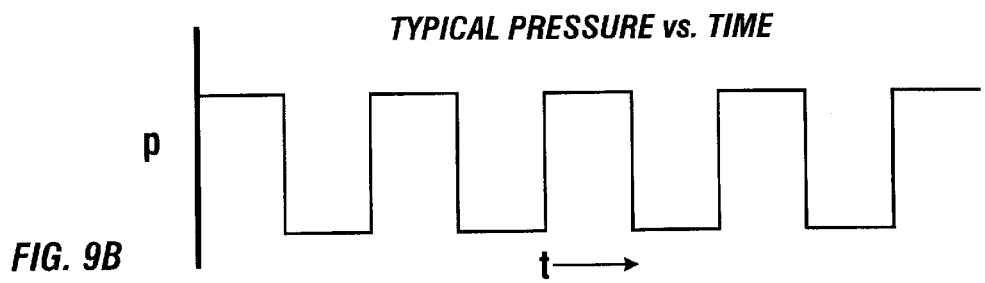
FIG. 9b shows a pressure versus time profile which may be used in the device of FIG. 10a to form the positioner according to an embodiment of the present invention.
Figure 9C:
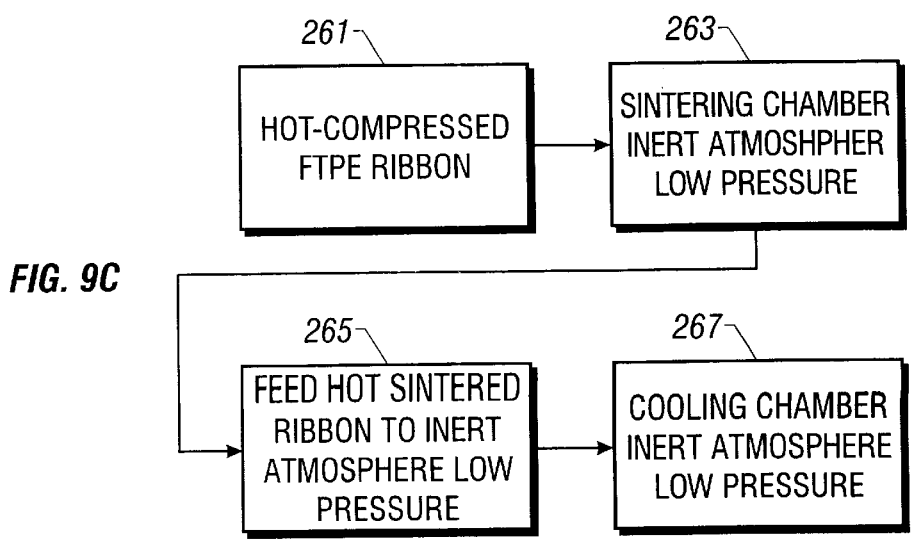
FIG. 9c shows a flow chart of the process which may be used to form the positioner according to an embodiment of the present invention.

Referring to FIG. 9a, an inert atmospheric chamber 251 is shown in which a continuous feed of sintered material in ribbon form 253 is entering. A ribbon heather chamber 255 is shown within inert atmospheric chamber 251 to heat ribbon 253. A tapered forming die set 257 accepts ribbon 253. A pulsating pressure piston 259 applies an annealing pressure wave to the heated sintered ribbon 253, thereby reducing internal stress and improving the form stability. The pulsating pressure piston 259 may employ pulsations having a time pattern similar to that shown in FIG. 9b. The percent compression is set by die stops. These steps are shown in the flow chart of FIG. 9c. In particular, step 261 shows the hot compressed FTPE ribbon prior to introduction into inert atmospheric chamber 251. Step 263 shows the entrance of the ribbon into a sintering chamber at low pressure. Step 265 shows the feed of the hot sintered ribbon into the insert atmospheric pulsating die set as shown in FIG. 9a. Step 267 is the final step where the hot ribbon is sent to a cooling chamber at low pressure.

Helical Twist

The final forming step for an embodiment of the present quad cable invention involves imparting an appropriate twist to the positioner. The desired helical twist is produced in a process which assembles only the center positioner without conductors and then in a heated phase imparts, by way of a forming die system which is held at a temperature below the glass transition temperature ($T_g$), the desired helical twist to the assembly. The cooled assembly is subsequently partially opened during a next stage in which the conductors are installed in their notches. Next, the assembly is pressed closed as it enters the following stage whereby the internal shield (or mirror) materials are assembled to the cable preform. This assembly is then ready for the final covering with the shield section, tensile member and outerjacket.

Following the extrusion process, the positioner may be ready to install. Appropriate thermoplastic materials for the positioner may be such that the resistivity of the positioner material is between about $10^5$ to $10^{18}$ ohm-sec, its dielectric constant is between about 1.05 to 4.0, and its low dielectric losses have a tangent of loss less than 0.1 over the target frequency range, generally up to or greater than a GHz.

Other material properties are that the positioner material should have aging and weathering properties such that, for a temperature range of −50° C. to +50° C. and a humidity range of 0 to 100%, less than 1% variation of electromagnetic functionality should result. The flexural modulii of acceptable plastic materials for the positioner span a range of about a minimum of $0.07 \times 10^9$ Pascals ($0.01 \times 10^6$ psi, typical of soft polyethylene and probably PTFE) to a maximum of $6.89 \times 10^9$ Pascals ($1.00 \times 10^6$ psi, typical of PAEK). These types of materials are variously moldable or need to be "sintered" so they span the range of types. A glass filled polypropylene may also be a candidate material. Various mixtures of these materials may also be used.

Driving and Terminating for Good Balance

There are three frequency domains of particular interest for the network operation contemplated by this disclosure: 1) the DC or low frequency range for power or for very low frequency signaling as with the POTS ringing voltage at around 20 Hz; 2) the low frequency or voice frequency range from about 375 Hz to about 3400 Hz; 3) the broadband high frequency range for digital data reaching to around 1 GHz.

The driver means and the terminating means contemplated can separate these three ranges effectively so as to isolate any interaction between them. The type of digital data format which seems most desirable in light of existing world standards is the SONET or SDH format which are the accepted current standards by which most worldwide fiber optic communications operate. A basic frame or "time box-car" of this time division multiplexing scheme was set to 125 micro-seconds in duration, i.e., one group every $\frac{1}{8000}$ of a second. The structure of the time slots of either of these two formats is shown in FIG. 14. The organization of each frame is represented by 810 time slots or "pigeon holes" which are shown arranged in a matrix 283 of 9 rows by 90 columns. Each slot 281 contains one eight bit word or byte. The bytes flow row by row in sequence starting at 1 and ending at 810 for each 125 µs frame. There are then 6480 bits per frame which at 8000 times per second gives the basic bit rate of 51.84 Megabits per second. This is only the basic or minimum bit rate or the STS-1 format when in electrical form. When used to produce an optical signal for, say, a fiber optic path, this format is then called an OC-1 (optical carrier). The SONET and SDH standards include the use of an 8 bit coding scheme, known as B3ZS, which operates to prevent extended runs of ones or zeros by modifying the digital word in a fashion which allows the decoding or recovery of the true source data. This scheme was developed to prevent significant low frequency energy from shifting the base line of the signal which would in turn disturb the accurate recovery of the digital signal. Thus, this format avoids substantial low frequency components in the 51.84 MHZ signal.

The basic STS-1 frame is used as the framework for further time division by placing up to 192 times the data in this fundamental format. That is, each 125 microsecond frame subdivides each of the 810 cells into as many as 192 words, each just 8 bits long. This multiplies the bit rate as well by up to 192 times, resulting in a current maximum 9.9456 GHz bit data rate. Current standards commonly use multiples of 3, 12, 24, 48, 96, and 192 times the base rate in the working communication systems used throughout the world. The electrical signal mode contemplated for some of the types of last mile cable systems disclosed herein is typically either STS-3 (155.52 MHZ) or STS-12 (622.08 MHZ). In these cases, there need be only very limited low frequency response in that portion of the balanced drive or terminating means employed by the present invention.

Most signal processing circuit topologies, especially those using integrated circuit techniques, are single-ended or unbalanced designs. Means must be employed to couple into and out of the balanced quad design to such unbalanced single ended circuits while preserving the EMIR and XTLK performance of the cable. Balun devices having properties resembling transformers have previously been used for this purpose. C. L. Ruthroff published a classic paper relating to this subject in the August 1959 issue of Proceedings of IRE, pp. 1337–42. Such designs have limited common mode rejection (CMR) and some relevant bandwidth limitations. Quasi- transmission line devices using multi-apertured ferrite cores have also been used to make baluns but these have difficulty achieving CMR better than 25 to 30 dB over a wide bandwidth. Two example U.S. Patents are Nos. 5,220, 297, to Crowhurst, "Transmission Line Transformer Device"; and 5,379,006, to McCorkle, "Wideband (DC To GHz) Balun".

FIGS. 13 and 14 detail driver and terminating devices which may be employed in the present invention. In the novel driver and balanced receiver system, terminating impedances are controlled essentially by the "delta" configured resistors. In both cases, these small film resistor arrays isolate the DC and low frequency components on the lines by means of the high pass filters 501 shown and the physically small capacitors integrated into each delta resistor array.

Figure 12:
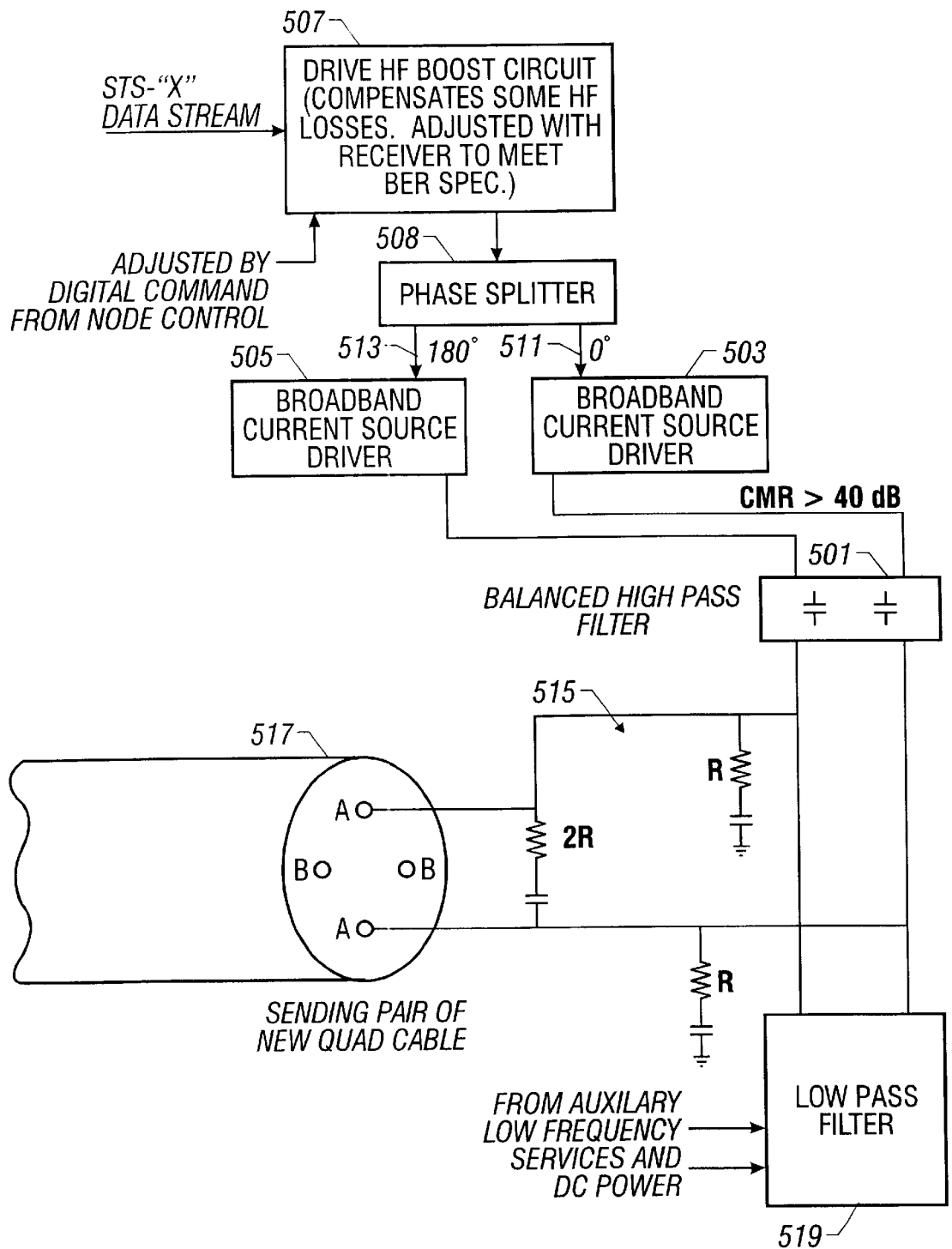
FIG. 12 shows a schematic form of a possible drive and terminating means to achieve a balanced operating condition for a quad cable.

The balanced driver, shown in FIG. 12, includes push-pull signal current sources 503 and 505, which drive the cable, plus source and terminating resistor arrays thereby minimizing impedance changes in transitions or in either "one" or "zero" states. In particular, FIG. 12 shows a STS-formatted data stream entering a drive high frequency boost circuit 507. The high frequency boost circuit 507 compensates for losses. The high frequency boost circuit 507 is adjusted with the receiver aperture boost circuit 509 (FIG. 13) to meet BER specifications. The output of the high frequency boost circuit is sent to a phase splitter 508. The output of the phase splitter 508 is two signals 180° out of phase. The first signal shown by line 511 enters one broadband current source driver 503. The other signal shown by line 513 enters the broadband current source driver 505. A balanced high pass filter 501 receives both signals. These pass through the resistor array 515 into the quad cable 517. Also shown in FIG. 12 is a low pass filter 519 which accepts inputs from auxiliary low frequency services, as well as DC power sources. These low frequency signals are sent into cable 517 as well, to provide, for example, lines 55 and 57 of FIG. 2.

The receiving end of the balanced line, shown in FIG. 13, terminates in the passive resistor array 515' coupled to the push-pull cascode long-tailed input amplifier. This stage couples the signal to the system or to a digital clocked comparator with very good CMR over the full bandwidth. FIG. 13 shows in more detail the balanced cable receiver system. The receiving end of cable 517 is received in a passive resistor array 515'. The low frequency components of the signal pass through low pass filter 519' to auxiliary low frequency services and provide DC power. The high frequency components pass through the high pass filter 501'. The high frequency components pass to a balanced input amplifier 521. The balanced input amplifier 521 may have a differential cascode long-tailed pair architecture. The CMR of the balanced input amplifier may be greater than 40 dB across the bandwidth. The output of the balanced input amplifier may be passed through a DC restorer synchronous clamp system 523. The output of the clamp system is sent to a receiver aperture boost circuit 509. The receiver aperture boost circuit 509 may be used to trim the so-called "eye pattern" to meet BER specifications. The output of the receiver aperture boost circuit 509 is the data stream.

Such driver and receiver stages have demonstrated performance of better than 50 dB CMR. In a fully integrated design, this level of performance should be closely approached at relatively low cost. The types of input and output stages discussed herein are easily incorporated into the regenerator modules for use in the cable system as previously disclosed above.

Also shown in the figures as described above are-transient voltage clamping devices to avoid high voltage pulses from a variety of possible sources. (e.g., electrostatic discharges, nearby lightning or EMP, or connection or service transients).

Use of This Quad for "Firewire" Applications

Recently a new serial data buss standard for use with computer peripherals has begun to achieve widespread use. This new standard is the IEEE 1394 or its near equivalent in the international IEC 1883. The appellation "FIREWIRE" has been widely used to name this new buss wire and system. The physical interconnecting cable of these systems uses two twisted pairs and two power supply wires inside overall shields. FIREWIRE was originally intended for relatively short lengths to interconnect a variety of accessories to a personal computer. These standards have grown in range and in operating data rates so the original 100 Megabit/sec limit now ranges to 400 Mb/s and it is proposed to reach still further to as high as 1200 Mb/s. Such cables, as modified by the invention, may be quite suitable to connect many current and future types of appliances, information devices and accessories throughout a home or office.

The form of the cable of the present invention readily lends itself to that objective. The cable may be easily modified to include within it two power leads. A reduced size version can certainly be designed for interior environments. The unique advantages of this form of cable can be exploited for such uses and at a substantial savings for this more limited application.

Interestingly, the root buss cycle arbitration selected by the standard uses the same interval as the SDH and SONET protocols—125 microseconds. In view of the active always-connected user interface of the disclosed global communication system, and the high data rate objectives of FIREWIRE, these systems would seem to match well, with data functions easily interfaced for the local environment. Such FIREWIRE forms of the novel cable structure and such applications are fully contemplated by this disclosure.

Example of a Manufacturing Process

This example utilizes a positioner of the form of FIG. 7 but in which the radial locator spaces for fibers are omitted. The material selected for this example is PTFE. The diameter of the assembled core is 0.420 inches. It is formed by the "green" extrusion, sintering and final forging operation as described above. It is preassembled and then formed in an inert atmosphere heated tunnel to give a helical twist of 1.8 turns per foot. The Unitary Tubular Annular conductors (UTAc) are spaced 0.200 inches apart on centers and the orthogonal quad array is centered in the 0.420 inch diameter of the core support.

The UTAc's are fabricated of 0.0384 inch OD tubing, soft annealed and formed from one of the high nickel iron alloys (18–30% Ni) which are axially magnetizable to greater than 0.6 Tesla. The ID of the tube is approximately 0.026 inches. This tube is fabricated as a continuous length of formed, rolled and fused material yielding a "seamless" construction with a smooth inner surface. It is plated with copper and electropolished to a smooth bright finish and to a thickness of 28 microns. This surface is then coated by extruding the magnetic matrix of urethane enamel containing the Ni—Zn ferrite powder as described above to a finished additional thickness of 11–14 microns after solidification in the axial magnetizing field. This may be performed as a continuous operation after the plated tubing is formed. The solidified assembly is then coated with a soft urethane enamel material to a thickness of 4 to 6 microns in a multistage dipping and drying process similar to that used to coat the insulation on magnet wire. It is convenient to color code this layer to identify each of the four UTAc's in a finished cable. This completes the forming of the Unitary Tubular Annular conductor which at this stage should be stored on reels with a minimum diameter of four feet.

The next process step for the conductors is to draw into the selected tube or tubes the required number of optical fibers using appropriate lengths selected for the run lengths of the intended finished cable (from, say, 4000 ft to the shortest lengths to be used, typically 400 ft). The optical fibers are single mode, plastic coated and color coded for identification. They are drawn by a fine steel wire leader into the tube, in a generally straight path, along with the super-absorbent compound which also then acts as a lubricant for the fiber drawing operation. Depending on the application, fibers may be inserted in only one or a few of the UTAc's. A minimum suggested fiber content is one per UTAc in each of the two electrical signal pairs.

Four of the appropriately selected lengths of tubes are next assembled in a continuous parting and reassembly of the PTFE positioner. At this point, the preselected core cable lengths are ready for the shield assembly following the schedule outlined above under Shield Design. The outer covering layers should employ the EMI "symmetricizing" first shield layer (symmetrizer) and the second (outermost) shield layer having the resistive spatial impedance design described above (outer impedance-matching housing). These shielding steps complete the assembly of the finished cable. The finished cable should be stored on reels of four foot minimum diameter.

Subsequent to the cable manufacture, the termination of the ends are performed in a different environment wherein the cable ends are cut back to an appropriate length to allow the optical fibers to be tailored to an appropriate service length of fiber, buffered by some supporting plastic buffer tube. The fibers may be left in this state for future use or terminated in selected connectors. At the same time, the tubular annular conductors are electrically connected by a shrink sleeve splice to provide the very short electrical connections to the source driver and receiver terminating devices.

This cable example may be used in the Node system at, e.g., STS-3 or 155 Megabit/sec, or for data at 622 Megabits/sec (STS-12).

Figure 15:
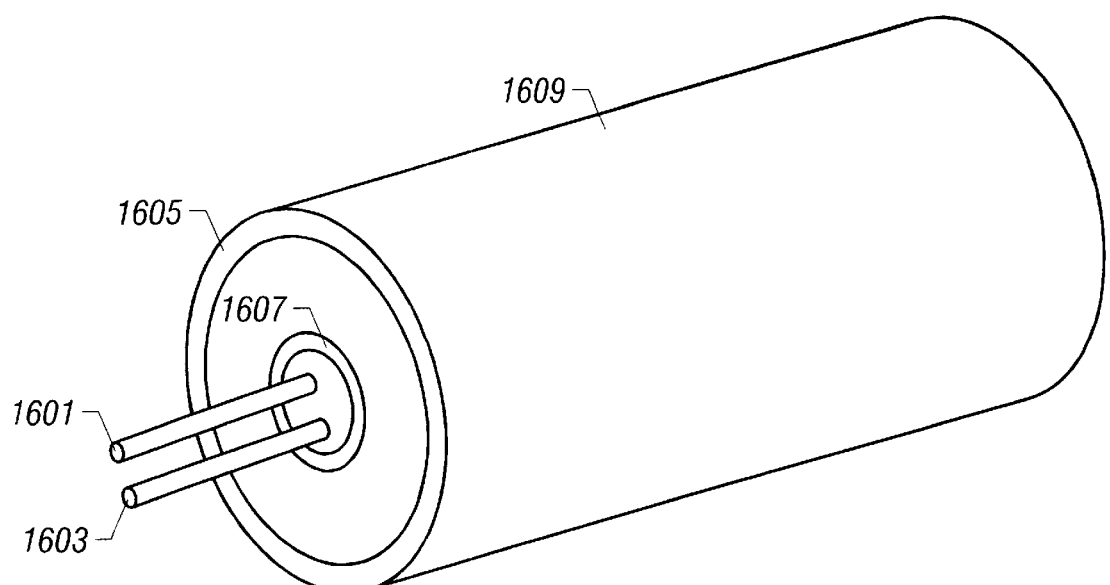
FIG. 15 shows a twinaxial cable employing an embodiment of the present invention.
Figure 16:
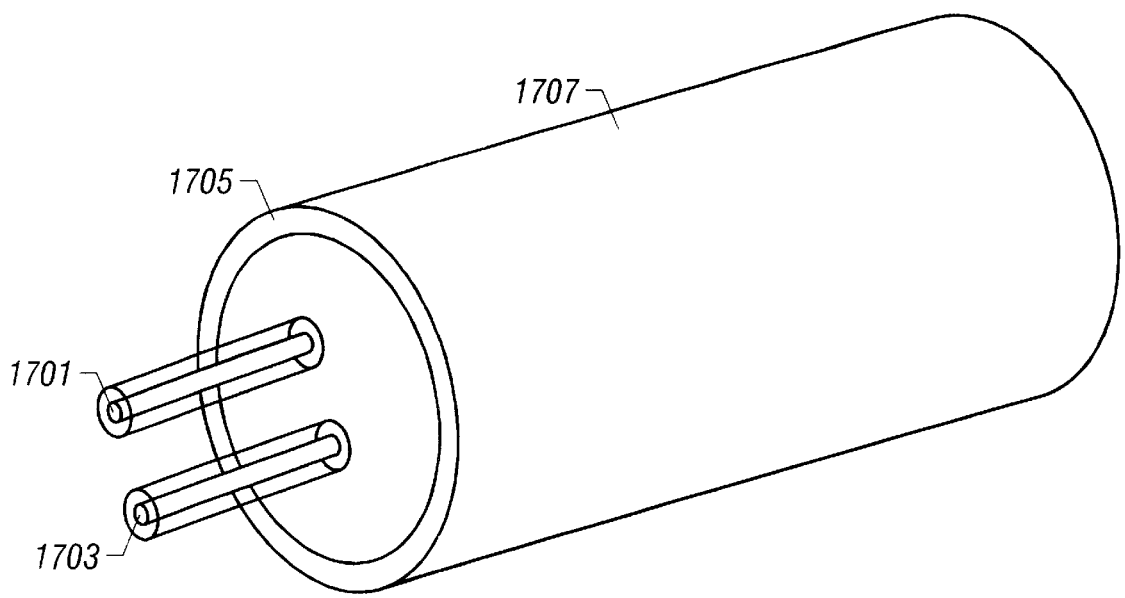
FIG. 16 shows a dual coaxial cable employing an embodiment of the present invention.

A number of embodiments of the present invention have been described. Nevertheless, it will be understood that various modifications may be made without departing from the spirit and scope of the invention. For example, the symmetry and outer impedance-matching housing may advantageously be employed in coaxial cables. It may further be employed in twin-axial cables (FIG. 15) in which two coaxial cables 1601 and 1603 are located within a single jacket 1609. Dual concentric annular conductors 1605 and 1607 are provided in this embodiment. Similarly, referring to FIG. 16, some cable formats, such as Super VHS or Y/C, employ two coaxial cables where the returns are not coaxial. These may similarly benefit from an outer housing 1707 which is, impedance-matching. Of course, any of the cables may further benefit from a symmetrizing layer as well.

It should further be noted that each cable, e.g., 1701 and 1703, may also be a quad cable, for example. Triaxial cables are also contemplated by the invention.

Accordingly, other embodiments are within the scope of the following claims.

What is claimed is:

1. A fabrication process for an extruded form resulting in a form having reduced internal stresses, comprising:
   a) delivering a melted extrudate to a fabrication tool;
   b) cyclically applying pressure to the melted extrudate;
   c) forming the extrudate while reducing the applied pressure to substantially atmospheric pressure; and
   d) cooling the formed extrudate in a bath, while the formed extrudate is substantially at the pressure achieved in step c), from a temperature above the glass transition temperature to a temperature at which the extrudate is in substantially a solid state.

2. The process of claim 1, wherein the cooling step further comprises:
   a) cooling the extrudate in a sequential series of baths of gradually lower temperatures under a controlled temperature and pressure.

3. The process of claim 1, wherein the cyclical pressure varies between a low pressure of about 0 psi and a high pressure of about 2000 psi.

4. The process of claim 1, wherein the time period of the cyclical pressure is between about 1 to 10 milliseconds.

5. The process of claim 1, wherein the extrudate melt temperature is between about 100 and 300° C.

6. The process of claim 1, wherein the glass transition temperature is about −50° C. to 50° C.

7. A fabrication process for an extruded form resulting in a form having reduced internal stresses, comprising:
   a) delivering a melted extrudate to a fabrication tool;
   b) cyclically applying pressure to the melted extrudate while raising the temperature of the melted extrudate; and
   c) cooling the extrudate in a bath under a controlled temperature and pressure, further comprising shaping the extrudate into a cylindrical shape having a substantially circular cross-section, wherein the shape defines a plurality of holes, each hole substantially equidistant from the axis of the cylindrical shape, the holes configured and structured to be capable of holding annular conductors.

8. The process of claim 7, further comprising disposing annular conductors into the holes, the outer diameter of the annular conductors less than the inner diameter of the holes.

9. The process of claim 8, further comprising disposing optical fibers within the center of the annular conductors.

\* \* \* \* \*